United States Patent
Mangal et al.

(10) Patent No.: US 11,210,515 B2
(45) Date of Patent: Dec. 28, 2021

(54) ARTIFICIAL INTELLIGENCE BASED PLANTABLE BLANK SPOT DETECTION

(71) Applicant: ACCENTURE GLOBAL SOLUTIONS LIMITED, Dublin (IE)

(72) Inventors: Saurabh Mangal, Singapore (SG); Kamal Mannar, Singapore (SG); Julian Addison Anthony Samy, Singapore (SG); Sherly Cendana Koalitas, Singapore (SG)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 259 days.

(21) Appl. No.: 16/593,499

(22) Filed: Oct. 4, 2019

(65) Prior Publication Data

US 2020/0320294 A1 Oct. 8, 2020

(30) Foreign Application Priority Data

Apr. 2, 2019 (SG) .............................. 10201902958P

(51) Int. Cl.
| | | |
|---|---|---|
| *G06K 9/00* | (2006.01) | |
| *G06N 3/08* | (2006.01) | |
| *G06K 9/62* | (2006.01) | |
| *G06T 7/40* | (2017.01) | |

(Continued)

(52) U.S. Cl.
CPC .......... *G06K 9/00657* (2013.01); *B64C 39/02* (2013.01); *G06K 9/00651* (2013.01); *G06K 9/48* (2013.01); *G06K 9/622* (2013.01); *G06K 9/628* (2013.01); *G06K 9/6262* (2013.01); *G06N 3/08* (2013.01); *G06T 7/40* (2013.01); *B64C 2201/123* (2013.01); *G06T 2207/20044* (2013.01); *G06T 2207/20084* (2013.01); *G06T 2207/30188* (2013.01)

(58) Field of Classification Search
CPC .... G06K 9/00657; G06K 9/6226; G06K 9/44; G06K 9/4628; G06K 9/622; G06K 9/00651; G06K 9/628; G06K 9/6262; G06K 9/48; G06T 7/40; G06T 2207/20044; G06T 2207/30188; G06T 2207/20084; B64C 39/024; B64C 2201/127; B64C 2201/12; B64C 39/02; B64C 2201/123; G06N 3/0454; G06N 3/0472; G06N 7/005; G06N 3/08
See application file for complete search history.

(56) References Cited

U.S. PATENT DOCUMENTS 11,074,447 B1 * 7/2021 Fox ..................... G06K 9/00657
2017/0372259 A1 * 12/2017 Lesser .................. G01C 21/165
(Continued)

*Primary Examiner* — Christopher M Brandt
(74) *Attorney, Agent, or Firm* — Mannava & Kang, P.C.

(57) ABSTRACT

In some examples, artificial intelligence based plantable blank spot detection may include generating a plurality of clusters of input images of areas that are to be analyzed for plantable blank spot detection. For each cluster of the plurality of clusters, a model may be identified to analyze corresponding images of a cluster. A model may be selected, from the models identified for the plurality of clusters, to analyze the input images. Canal lines may be identified in the analyzed images. Plantable blank spots may be determined in the analyzed images. An operation of a drone may be controlled to validate the determination of the plantable blank spots.

20 Claims, 19 Drawing Sheets

(51) Int. Cl.
*B64C 39/02* (2006.01)
*G06K 9/48* (2006.01)

(56) References Cited

U.S. PATENT DOCUMENTS

| | | | |
|---|---|---|---|
| 2019/0146511 A1* | 5/2019 | Hurd | G05D 1/0088 |
| | | | 701/27 |
| 2019/0303703 A1* | 10/2019 | Kumar | G06N 3/084 |
| 2020/0178483 A1* | 6/2020 | Devecigil | G05B 13/028 |
| 2020/0279428 A1* | 9/2020 | Guay | G06T 13/40 |
| 2020/0402385 A1* | 12/2020 | Ishikawa | G01F 23/292 |

* cited by examiner

1500

GENERATE, BY AT LEAST ONE HARDWARE PROCESSOR, A PLURALITY OF CLUSTERS OF INPUT IMAGES OF AREAS THAT ARE TO BE ANALYZED FOR PLANTABLE BLANK SPOT DETECTION
1502

IDENTIFY, BY THE AT LEAST ONE HARDWARE PROCESSOR, FOR EACH CLUSTER OF THE PLURALITY OF CLUSTERS, A MODEL TO ANALYZE CORRESPONDING IMAGES OF A CLUSTER
1504

SELECT, BY THE AT LEAST ONE HARDWARE PROCESSOR, FROM THE MODELS IDENTIFIED FOR THE PLURALITY OF CLUSTERS, A MODEL TO ANALYZE THE INPUT IMAGES
1506

ANALYZE, BY THE AT LEAST ONE HARDWARE PROCESSOR, BASED ON THE SELECTED MODEL, THE INPUT IMAGES
1508

GENERATE, BY THE AT LEAST ONE HARDWARE PROCESSOR, TEXTURE FEATURES FOR THE ANALYZED IMAGES
1510

ARTIFICIAL INTELLIGENCE BASED PLANTABLE BLANK SPOT DETECTION

PRIORITY

The present application claims priority under 35 U.S.C. 119(a)-(d) to Singaporean patent application number 10201902958P, having a filing date of Apr. 2, 2019, the disclosure of which is hereby incorporated by reference in its entirety.

BACKGROUND

An image of an area, such as a forest or otherwise open land, may be analyzed to determine various attributes of the image. For example, the image may be visually analyzed to determine whether the area appears to be predominantly covered by a forest. Alternatively, the image may be visually analyzed to determine whether the area appears to be predominantly open land.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
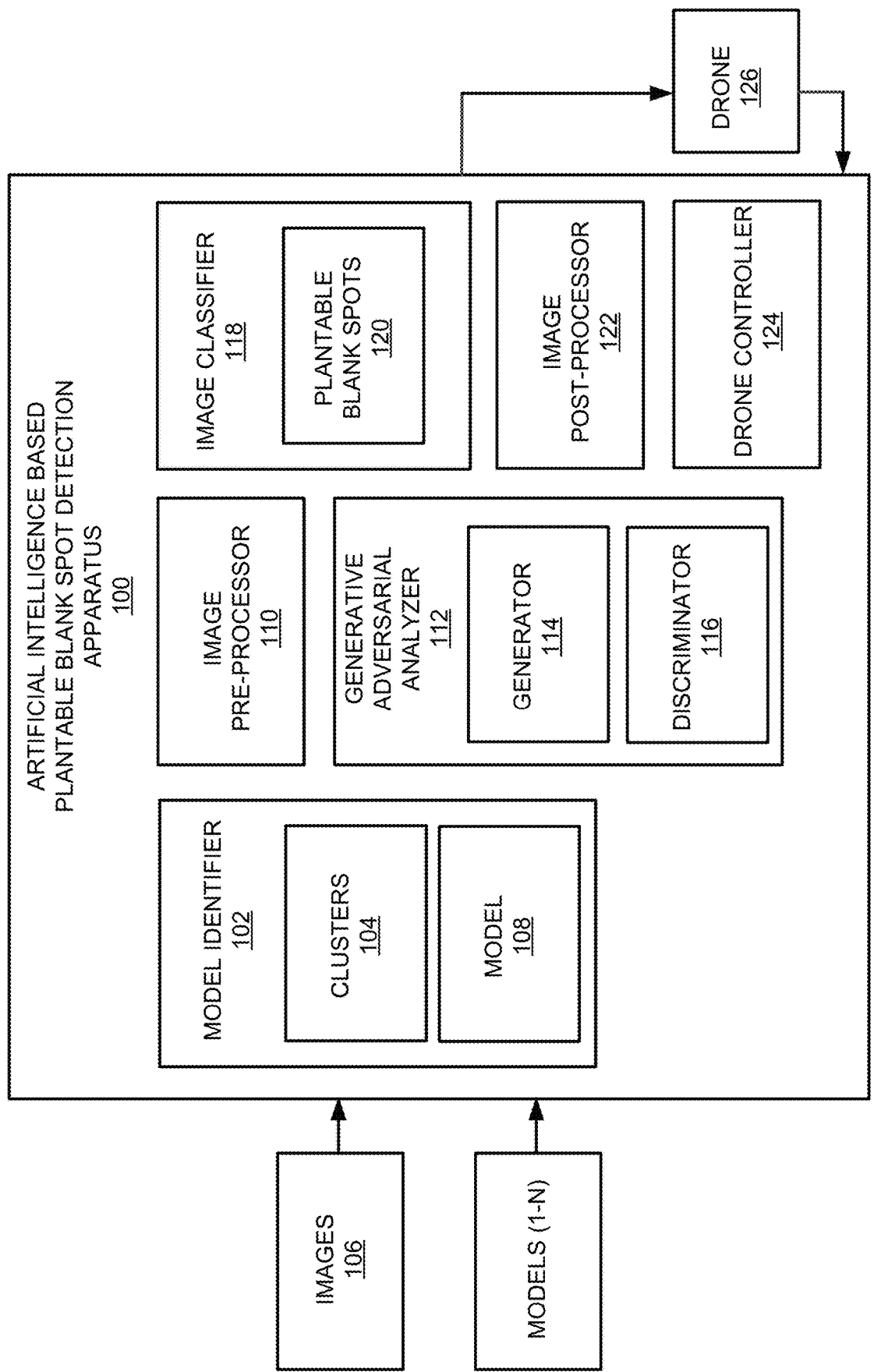
FIG. 1 illustrates a layout of an artificial intelligence based plantable blank spot detection apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based plantable blank spot detection apparatuses, methods for artificial intelligence based plantable blank spot detection, and non-transitory computer readable media having stored thereon machine readable instructions to provide artificial intelligence based plantable blank spot detection are disclosed herein. The apparatuses, methods, and non-transitory computer readable media disclosed herein provide for artificial intelligence based plantable blank spot detection as well as flood risk detection. In this regard, the term plantable may describe a land area where any type of vegetation (e.g., crops, trees, etc.) may be planted and grown. A flood risk may be described as a risk related to an area being flooded with water, where such flooding may damage the planted vegetation.

With respect to plantable blank spot detection, it is technically challenging to detect land areas that may be blank (e.g., where vegetation may be planted), and for those areas that are blank, areas that may be plantable. In this regard, it is technically challenging to detect land areas that may be at risk of flooding in the future, and therefore are not plantable.

In order to address at least the aforementioned technical challenges, the apparatuses, methods, and non-transitory computer readable media disclosed herein may generate results related to areas that are flooded or areas that are at risk of flooding, and may combine these results with detection of blank spots (e.g., low-density areas) using spatial techniques to identify plantable areas, which may be described as areas that may not be flooded (or may be at low risk of flooding) in the future. The results of the plantable blank spot detection may be utilized to increase product yield by identifying areas of interventions (e.g., re-planting). Further, the results of the plantable black spot detection may be validated by a drone that may be controlled, for example, to fly over an area including the plantable blank spot, and generate images of the area.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence based plantable blank spot detection apparatus (hereinafter also referred to as "apparatus 100").

Referring to FIG. 1, the apparatus 100 may include a model identifier 102 that is executed by at least one hardware processor (e.g., the hardware processor 1402 of FIG. 14, and/or the hardware processor 1604 of FIG. 16) to generate a plurality of clusters 104 of input images 106 of areas that are to be analyzed for plantable blank spot detection. The model identifier 102 may identify, for each cluster of the plurality of clusters 104, a model (e.g., from models 1-n) to analyze corresponding images of a cluster. The model identifier 102 may select, from the models identified for the plurality of clusters 104, a model 108 to analyze the input images 106. The model identifier 102 may analyze, based on the selected model 108, the input images.

According to examples disclosed herein, the model identifier 102 may generate the plurality of clusters of input images of areas that are to be analyzed for plantable blank spot detection by generating the plurality of clusters 104 based on an age of vegetation including trees, a species of the vegetation, and a land type of the areas that are to be analyzed for plantable blank spot detection.

According to examples disclosed herein, the model identifier 102 may select, from the models identified for the plurality of clusters, the model 108 to analyze the input images by determining, for each cluster of the plurality of clusters 104, from a plurality of available models (e.g., models 1-n), the selected model based on a highest number of matches to an age of vegetation including trees in the corresponding images of the cluster, a species of the vegetation, and a land type of the areas that are to be analyzed for plantable blank spot detection.

An image pre-processor 110 that is executed by at least one hardware processor (e.g., the hardware processor 1402 of FIG. 14, and/or the hardware processor 1604 of FIG. 16) may generate texture features for the analyzed images.

A generative adversarial analyzer 112 that is executed by at least one hardware processor (e.g., the hardware processor 1402 of FIG. 14, and/or the hardware processor 1604 of FIG. 16) may identify canal lines in the analyzed images.

According to examples disclosed herein, the generative adversarial analyzer 112 may identify canal lines in the analyzed images by implementing CycleGAN to identify canal lines in the analyzed images.

According to examples disclosed herein, the generative adversarial analyzer 112 may identify canal lines in the analyzed images by utilizing a generator 114 to learn features of a real-world input image, and translate the input image to a generated image. The generative adversarial analyzer 112 may utilizing a discriminator 116 to distinguish between the real-world input image and the generated image. The generative adversarial analyzer 112 may minimize a loss factor with respect to the generator 114 and the discriminator 116. Further, the generative adversarial analyzer 112 may identify, based on images generated by the generator 114 from the analyzed images, the canal lines in the images generated by the generator 114.

An image classifier 118 that is executed by at least one hardware processor (e.g., the hardware processor 1402 of FIG. 14, and/or the hardware processor 1604 of FIG. 16) may determine, based on the canal lines identified in the analyzed images, plantable blank spots 120.

According to examples disclosed herein, the image classifier 118 may determine, based on the canal lines identified in the analyzed images, plantable blank spots 120 by utilizing a convolutional neural network (CNN) to determine, based on the canal lines identified in the analyzed images, plantable blank spots 120.

According to examples disclosed herein, the image classifier 118 may determine, based on the canal lines identified in the analyzed images, plantable blank spots 120 by utilizing a convolutional neural network to distinguish between a flood area, a tree area, a weed area, and a plantable blank spot in each image of the analyzed images.

An image post-processor 122 that is executed by at least one hardware processor (e.g., the hardware processor 1402 of FIG. 14, and/or the hardware processor 1604 of FIG. 16) may perform canal contour extraction for the analyzed images. The image post-processor 122 may perform morphological operations of dilation, erosion, and subtraction for the analyzed images. Further, the image post-processor 122 may perform skeletonisation to connect individual canal contours for the analyzed images.

A drone controller 124 that is executed by at least one hardware processor (e.g., the hardware processor 1402 of FIG. 14, and/or the hardware processor 1604 of FIG. 16) may control an operation of a drone 126 to validate the determination of the plantable blank spots 120.

Operation of the apparatus 100 is described in further detail with reference to FIGS. 1-13.

Figure 2:
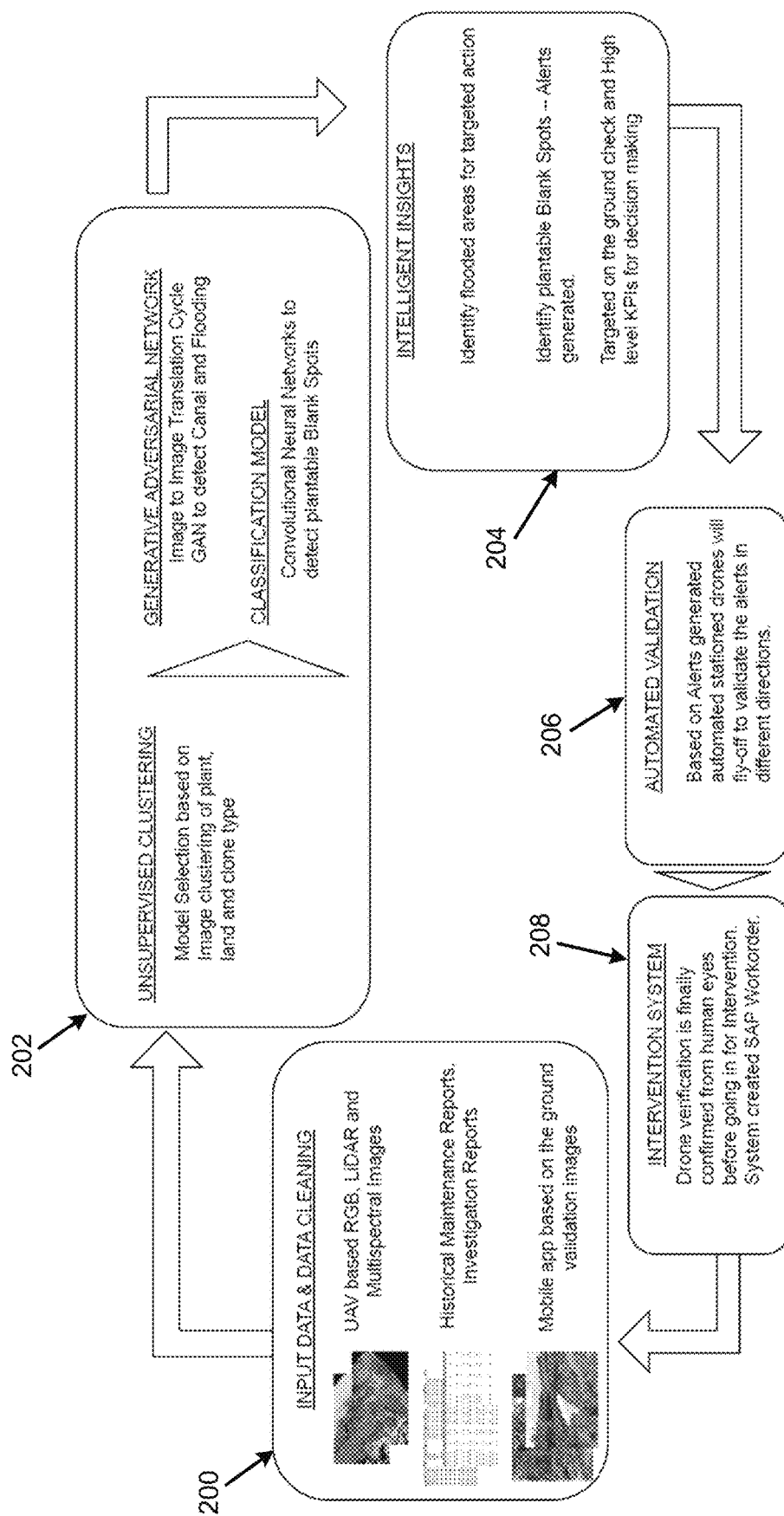
FIG. 2 illustrates a high level flow of the artificial intelligence based plantable blank spot detection apparatus of FIG. 1 in accordance with an example of the present disclosure.

FIG. 2 illustrates a high level flow of the apparatus 100 in accordance with an example of the present disclosure.

Referring to FIG. 2, at 200, the images 106 of areas that are to be analyzed for plantable blank spot detection may include unmanned aerial vehicle (UAV) based read, green, and blue (RGB) images, light detection and ranging (LiDAR) images, and multispectral images. The images 106 may further include historical maintenance reports, investigation reports, and other such reports. The reports may be used as metadata to call out the correct models and post-processing steps as disclosed herein. Also, these reports may include ground check results performed by a maintenance team, and may be used to validate alerts generated as disclosed herein. Further, the images 106 may include mobile application images based on ground validation images and/or drone validation images as disclosed herein.

At 202, clustering operations with respect to the model identifier 102, canal and flooding detection with respect to the generative adversarial analyzer 112, and plantable blank spot detection with respect to the image classifier 118 may be performed as disclosed herein with reference to FIG. 1. With respect to the clustering operations performed by the model identifier 102, clone type may represent a specific type of tree within a species of trees.

At 204, intelligent insights generated by the image classifier 118 may include an identification of flooded areas for target action, and an identification of plantable blank spots. With respect to the plantable blank spots, the image classifier 118 may generate an alert when a plantable blank spot is detected in an image. According to examples disclosed herein, the image classifier 118 may identify blank spots of a grid size of 10 m×10 m, which may be aggregated on a 1-hectare level. Alerts may include three levels (e.g., low, moderate, and high), and each alert level may correspond to an action taken by stationed drones or by maintenance personnel. Additional intelligent insights may include targeted ground-based checks for plantable blank spots, as well as key performance indicators (KPIs) for decision-making. For example, key performance indicators may include coverage of blank spots, stocking value as compared to maintenance data, etc. These key performance indicators may be utilized for further actions such as ordering a planting activity in these specific regions.

At 206, the drone controller 124 may control an operation of the drone 126, for example to validate a determination of a plantable blank spot. In this regard, based on the alerts generated at 204, the drone 126 may be deployed to validate the alerts.

At 208, drone validation may be confirmed, for example, by an operator before intervention, which may include planting of vegetation at the plantable blank spot.

Figure 3:
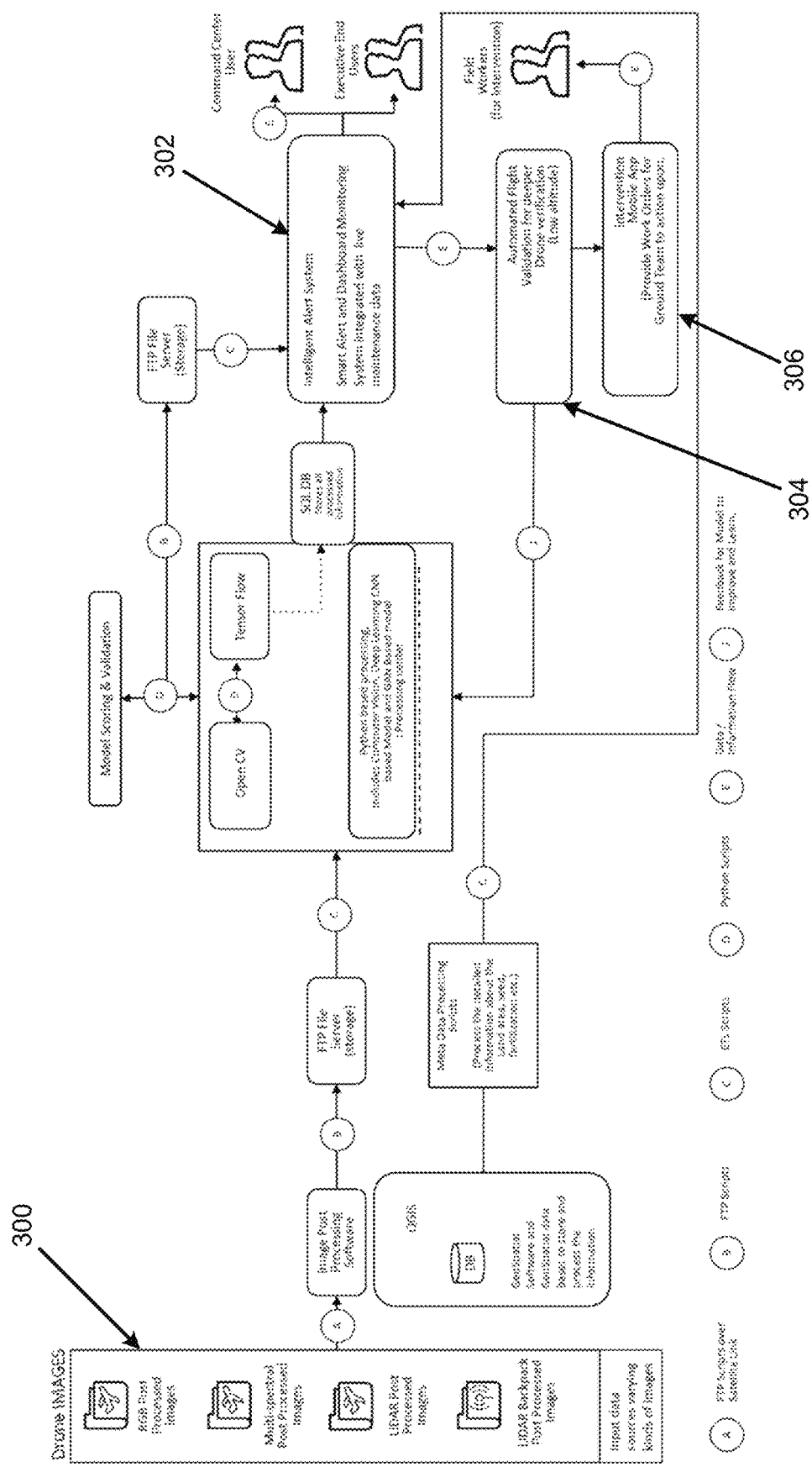
FIG. 3 illustrates an architecture of the artificial intelligence based plantable blank spot detection apparatus of FIG. 1 in accordance with an example of the present disclosure.

FIG. 3 illustrates an architecture of the apparatus 100 in accordance with an example of the present disclosure.

Referring to FIG. 3, different types of scripts and flows between different components of the apparatus 100 may be designated as paths A-E, and J. For example, for an example of implementation of the apparatus 100, file transfer protocol (FTP) scripts over a satellite link may be designated as path A, FTP scripts may be designated as path B, extract, transform, load (ETL) scripts may be designated as path C, PYTHON scripts may be designated as path D, data/information flow may be designated as path E, and feedback for model improvement and learning may be designated as path J. Images 106 may be received at 300. Alerts, as disclosed herein with respect to block 204 of FIG. 2 may be generated at 302. Automated validation and intervention as disclosed herein with respect to blocks 206 and 208 of FIG. 2 may be implemented at blocks 304 and 306.

Figure 4:
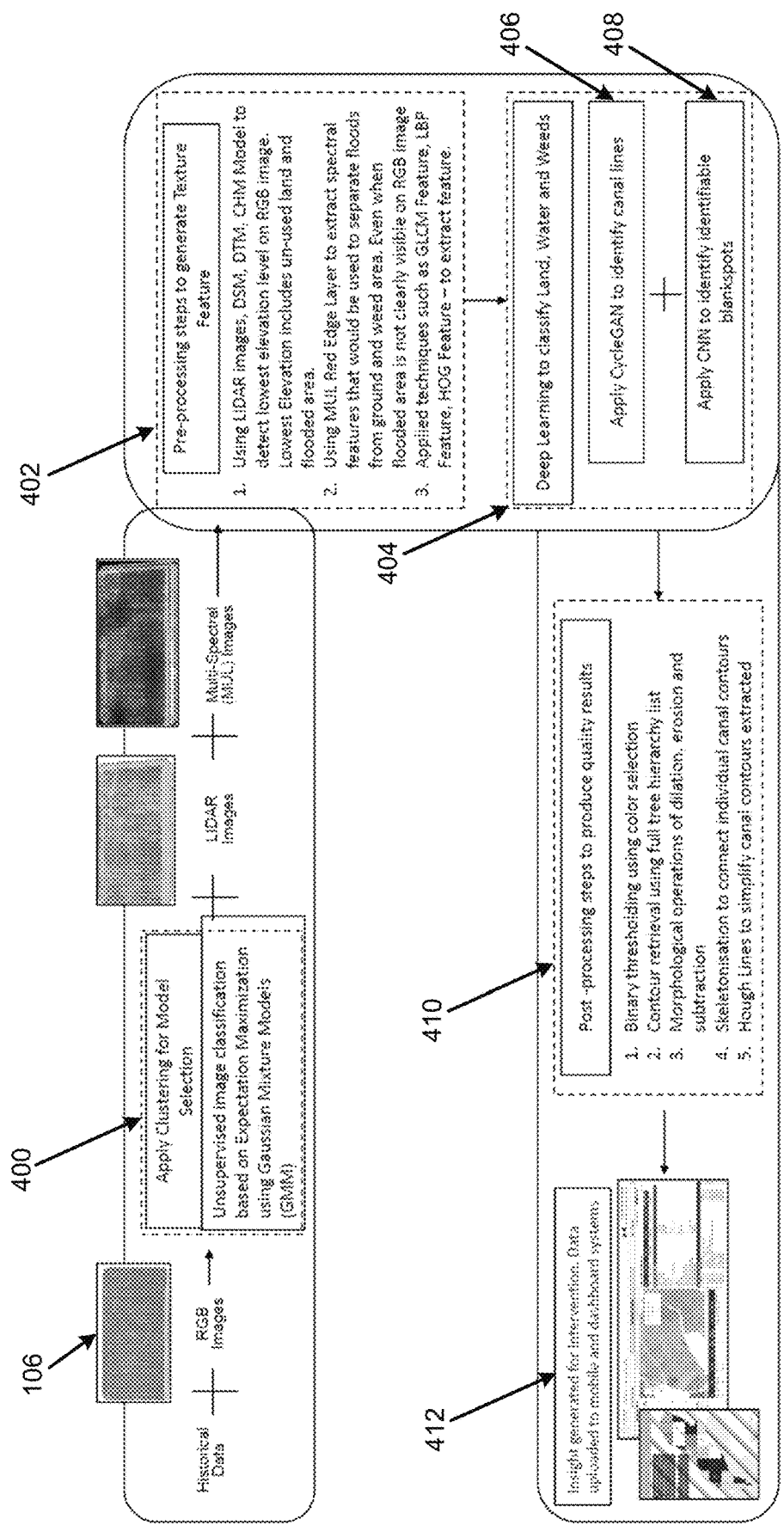
FIG. 4 illustrates a flooding and blank spot detection flow of the artificial intelligence based plantable blank spot detection apparatus of FIG. 1 in accordance with an example of the present disclosure.

FIG. 4 illustrates a flooding and blank spot detection flow of the apparatus 100 in accordance with an example of the present disclosure.

Referring to FIG. 4, at 400, the model identifier 102 may generate the plurality of clusters 104 of the input images 106. The model identifier 102 may perform unsupervised image classification based on expectation maximization using, for example, Gaussian Mixture Models (GMM). The expectation maximization may determine the probability of the image belonging in different clusters, and may use the mean and variance to re-estimate the actual mean and variance for each Gaussian distribution.

At 402, the image pre-processor 110 may generate picture features for the analyzed images by using LiDAR images, dynamic spectrum management (DSM), digital thermal monitoring (DTM), and canopy height model (CHM) to detect a lowest elevation level on RGB images. A LiDAR instrument may fire rapid pulses of laser light at a surface, and measure the time it takes to return to the sensor, at which elevation may be derived according to the time taken. The lowest elevation level may include unused land and flooded area. The image pre-processor 110 may implement multispectral (MUL) red edge layer to extract spectral features that may be used to separate floods from ground and weed areas, even when flooded areas are not clearly visible on an RGB image. In this regard, ground, trees, and water may absorb different wavelengths at different intensity, and the difference may be used to extract out the flooded areas. The image pre-processor 110 may further apply techniques such as gray-level co-occurrence matrix (GLCM) feature, local binary pattern (LBP) feature, and histogram of oriented gradients (HOG) feature, to classify and extract features of trees and weeds. GLCM may use the intensity of grayscale values in a single row of pixels and diagonally, the variances may be used as texture to identify different features. LBP may compare each pixel to its neighbors and the binary pattern may be used to identify, for example, two months old trees from ground or weeds due to their small size and distinguishable binary pattern.

At 404, deep learning may be implemented to classify, for example, land, water, and weeds. In this regard, the deep learning model may use expert labels and annotations, and may be trained on image samples of land, water and weeds. A convolutional neural network may be used as a base architecture of the deep learning model. The deep learning model may learn the features of land, water and weeds, and may account for variances in different samples. Image augmentation, where differences in contrast, brightness, hue color and shifts may be used as noise may improve robustness of the deep learning model. Once the deep learning model is trained, it may be tested on a set of testing data and images to measure the accuracy, precision and recall of the model.

At 406 and 408, canal and flooding detection with respect to the generative adversarial analyzer 112, and plantable blank spot detection with respect to the image classifier 118 may be performed as disclosed herein with reference to FIG. 1.

At 410, the image post-processor 122 may perform operations such as binary thresholding using color selection, contour retrieval using full tree hierarchy list, morphological operations of dilation, erosion, and subtraction, skeletonisation to connect individual canal contours, and Hough lines to simplify canal contours that are extracted.

At 412, insights, such as the alerts disclosed herein, that are generated for intervention may be uploaded, for example, to mobile and/or dashboard systems.

Figure 5:
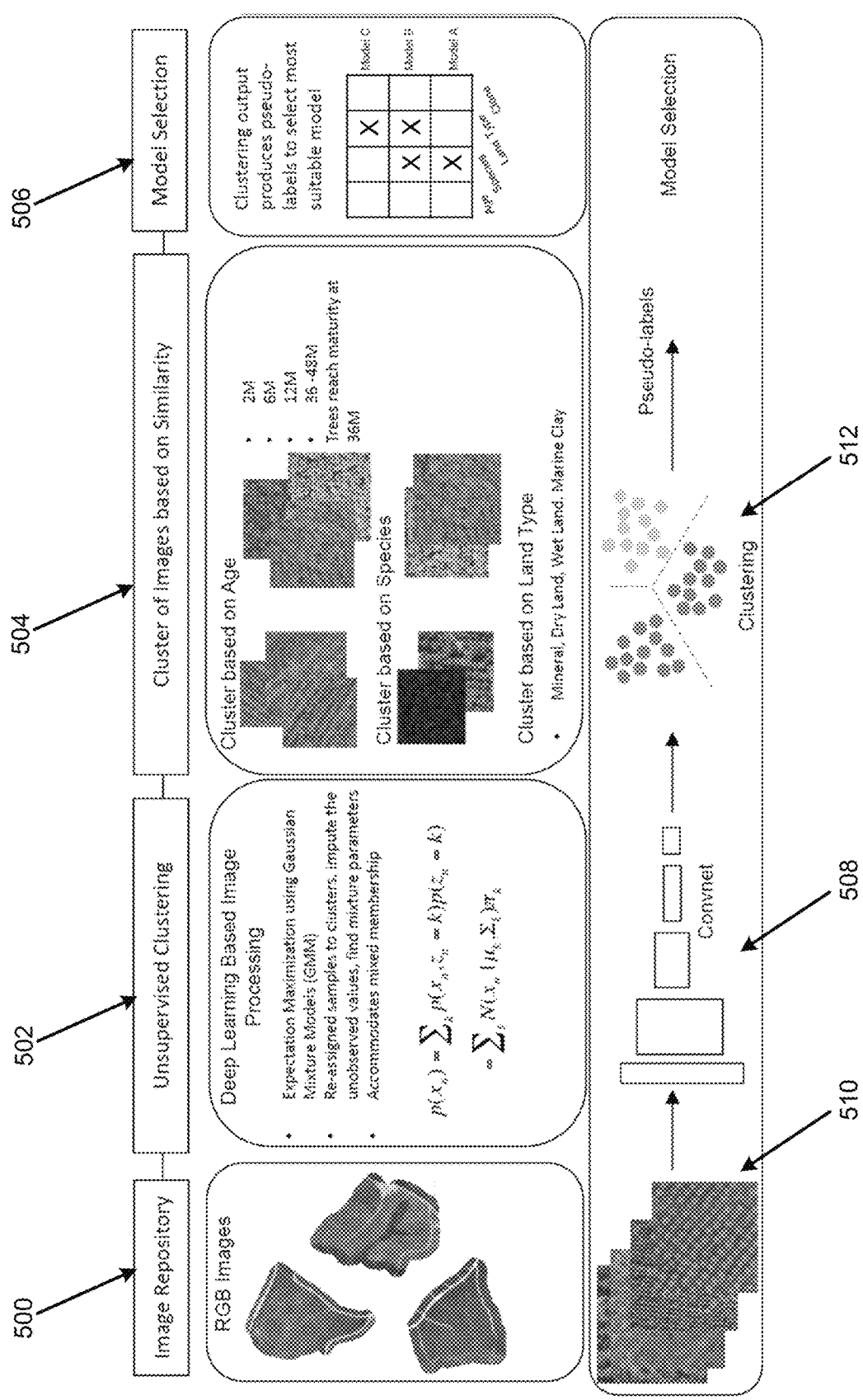
FIG. 5 illustrates intelligent model identification to illustrate operation of the artificial intelligence based plantable blank spot detection apparatus of FIG. 1 in accordance with an example of the present disclosure.

FIG. 5 illustrates intelligent model identification to illustrate operation of the apparatus 100 in accordance with an example of the present disclosure.

Referring to FIG. 5, as disclosed herein, the model identifier 102 may identify, for each cluster of the plurality of clusters 104, a model (e.g., from models 1-$n$) to analyze images of a corresponding cluster. In this regard, for an example of the images 106 that include RGB images at 500, at 502, the model identifier 102 may perform deep learning based image processing to determine what an image pertains to. The model identifier 102 may perform expectation maximization using Gaussian Mixture Models (GMM), where based on the mean and co-variance to emulate the probability of belonging to a single cluster, the GMM may re-estimate the mean and variance of each cluster and provide the optimal number of clusters. The model identifier 102 may reassign samples to clusters, impute unobserved values, and determine mixture parameters. Further, the model identifier 102 may accommodate mixed membership as this may represent a soft clustering model where clusters may overlap. Hence an image may belong to multiple clusters, each with a probability score:

$$p(x_n) = \sum_k p(x_n, z_n = k)p(z_n = k) = \sum_k N\left(x_n \mid \mu_k, \sum_k\right)\pi_k \quad \text{Equation (1)}$$

For Equation (1), $p(x_n)$ may represent the probability of an image belonging to a specific cluster, $z_n$ may represent the membership scores of the image in the various clusters, k may represent the cluster number, N may represent the total number of clusters, $\mu_k$ may represent the vector of parameters, and $\pi_k$ may represent various Gaussian model distributions.

At 504, the model identifier 102 may cluster the images 106 based on similarity. For example, the model identifier 102 may cluster the images 106 based on age, such as an age for trees of two months, six months, twelve months, etc. The clustering may also be based on other attributes such as species, land type (e.g., mineral, dryland, wetland, marine clay, etc.), and other such attributes.

At 506, the model identifier 102 may select a model 108, for example, from available models A, B, and C. In this regard, assuming that the images at 500 include species that correspond to models A and B, and land type that corresponds to models B and C, the model identifier 102 may select model B as the most suitable model for the images 106 since model B addresses both the species as well as the land type associated with the images. For example, based on the clustering results, the images may be mapped to a mineral land type of one particular type of tree species or plant species. Using unsupervised clustering, a determination may be made as to which cluster an image belongs to, and the results may be validated using historical data such as planted species and planting regime. Once the associated model is confirmed, the model may call out the tree species, soil type and tree age, for example, tree species A, soil type mineral land, and age of two months, for use cases such as weed, flood, blank spot and tree models.

In order to generate a model (e.g., the models A, B, and C), a convolution neural network as shown at 508 may be trained on a plurality of images at 510 to generate clusters at 512.

Figure 6:
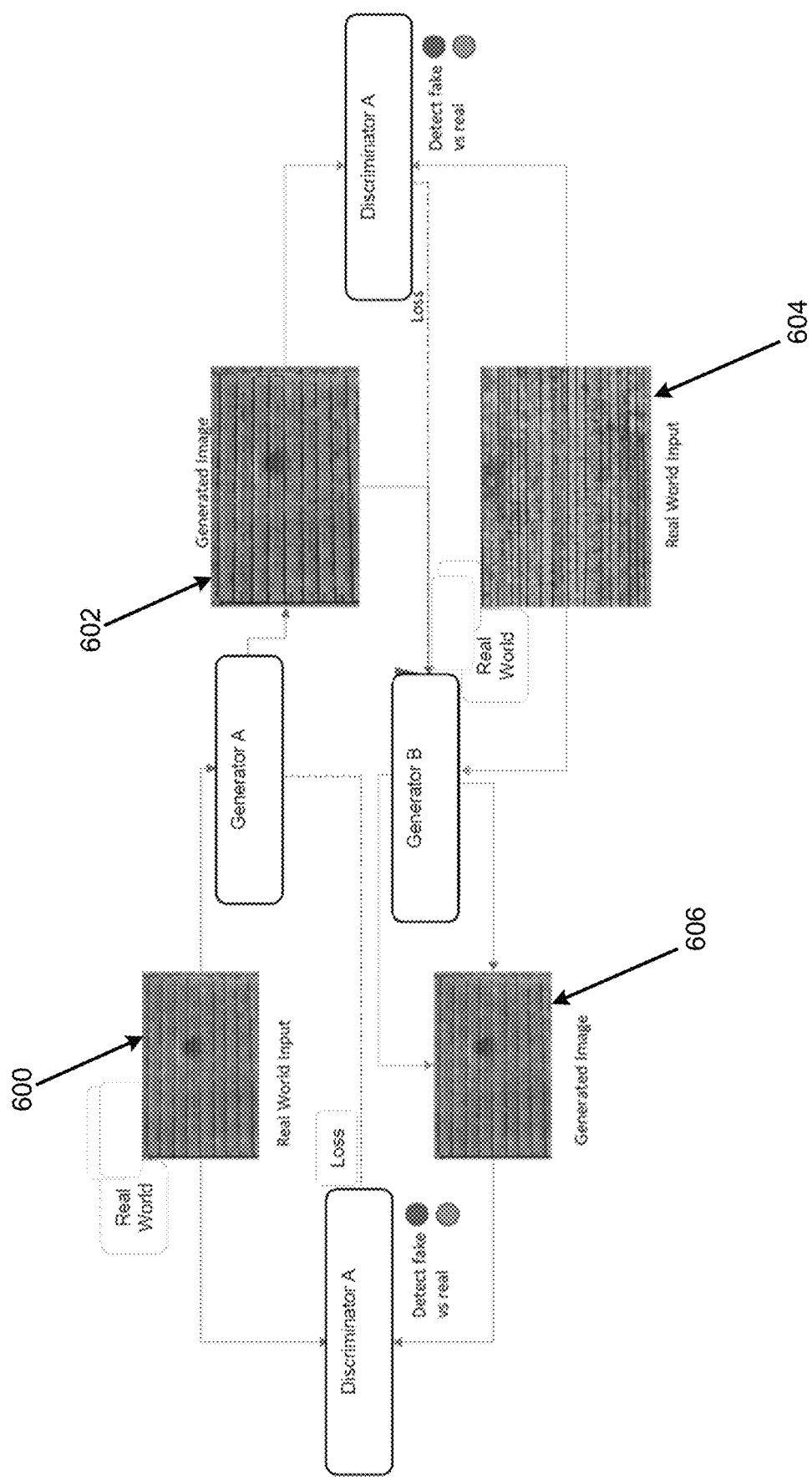
FIG. 6 illustrates generative adversarial analysis including discriminator and generator operations to illustrate operation of the artificial intelligence based plantable blank spot detection apparatus of FIG. 1 in accordance with an example of the present disclosure.

FIG. 6 illustrates generative adversarial analysis including discriminator and generator operations to illustrate operation of the apparatus 100 in accordance with an example of the present disclosure.

Referring to FIG. 6, as disclosed herein, the generative adversarial analyzer 112 may implement CycleGAN to identify canal lines in the analyzed images. In this regard, generated adversarial networks (GANs) may transfer style and color into another image. The CycleGAN may utilize the image translation capability of GAN to perform feature extraction, for example, for features such as the canal lines and planting lines. The CycleGAN may utilize a training sample that is based on expert annotation of canal and planting lines. The GAN model may regenerate a false (e.g., fake) annotation based on the expert's label, and attempt to pass it off as real and as similar to expert annotation. The feature extraction may be utilized to detect canal lines and planting lines that are not straight. The canal lines and planting lines may be used for flood detection where canal lines of various curvature and thickness can be detected using GAN models, and therefore improve flood detection since this provides for the avoidance of water bodies required to be in the plantation. Thus, both of the Cycle Consistent Generative Adversarial Networks may be combined to detect canal lines. The results may be post processed with computer vision techniques such as morphological operation (open, close, dilation, erosion), skeletonization, and Hough line transformations.

For the example of FIG. 6, the generator A may receive a real-world input image at 600, and generate, at 602, a generated image that includes canal lines. Similarly, the generator B may receive a real-world input image, for example, with expert annotation of canal lines at 604, as well as the generated image at 602, and generate, at 606, a generated image that does not include canal lines. In this regard, neurons may be activated to add a composition of canal lines in the images, and over the training sample, the generator may learn where to compose the canal lines in the image or remove the canal lines from the image. The discriminator A may receive the real-world input image from 600 and the generated image from 606. Further, the discriminator B may receive the real-world input image from 604 and the generated image from 602. For the example of FIG. 5, processing may proceed from generator A to discriminator B, and from generator B to discriminator A. In this manner, the generator A may be trained (e.g., by learning) to receive a new image (e.g., one of the images 106) and generate canal lines for the new image.

Figure 7:
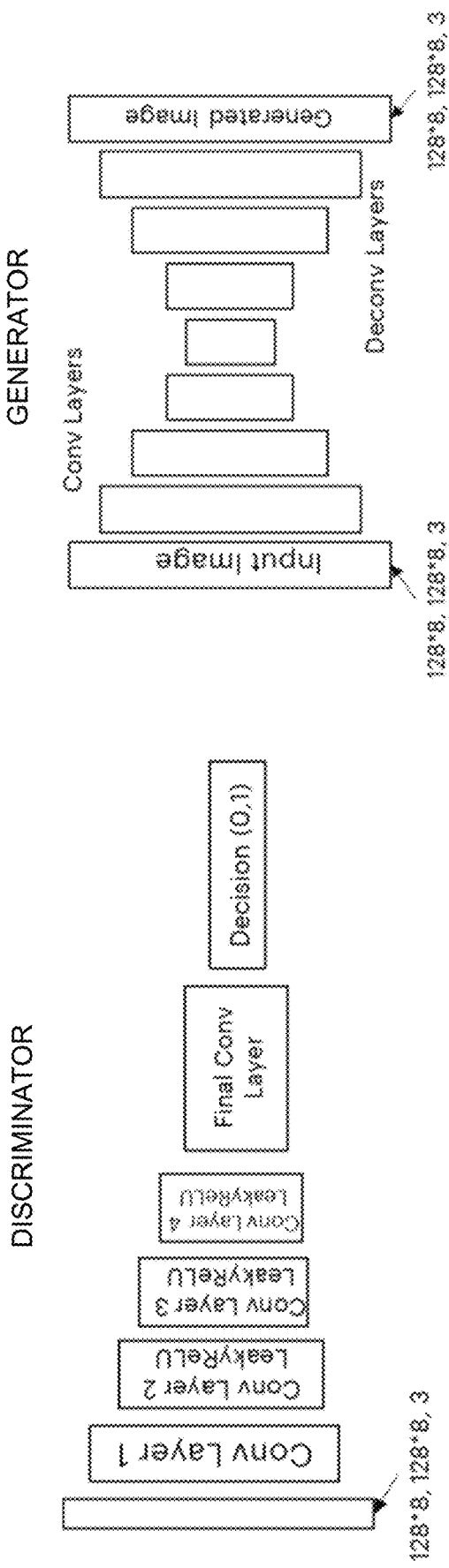
FIG. 7 illustrates generative adversarial analysis including discriminator, generator, and loss function operations to illustrate operation of the artificial intelligence based plantable blank spot detection apparatus of FIG. 1 in accordance with an example of the present disclosure.

FIG. 7 illustrates generative adversarial analysis including discriminator, generator, and loss function operations to illustrate operation of the apparatus 100 in accordance with an example of the present disclosure.

Referring to FIGS. 6 and 7, an objective of the discriminator may include distinguishing between a real-world input image and a generated image such that the discriminator is able to defy the adversary. Thus, the discriminator may assist the generator in generating a high quality image by analyzing images generated by the generator. The objective of the generator may include receiving a real-world input image, learning its features, and translating the real-world input image to a generated image. In this regard, identity mapping of images may be utilized such that generated images share similar color and features. The overall objective may include minimizing the maximum losses between the adversarial losses for matching the distribution of generated images to a data distribution in a target domain, and cycle consistency losses to prevent the learned mappings from contradicting each other. The objective function may minimize the two losses by mapping vectors on how similar or different the output, which is the generated image, is from the input, which is the real world or generated input.

Referring to FIG. 7, marginal matching loss may enforce that the adversarial objective is minimized to the generator, while the discriminator maximizes the loss. The different layers for the discriminator may represent the images which are essentially pixels of range 0 to 255, and the different convolutional layers which are a set of learnable kernels where the weights are connected. The max pooling function may reduce the number of parameters. Further, the last fully connected layer may maintain the weights from the previous connected layers. At the decision layer, the network may assign the probability 0 or 1 to whether this is a real input or a false (e.g., fake) generated input. The marginal matching loss may be determined as follows:

$$L_{GAN}(G_{AB}D_B) = \sum_{B \sim Pd(b)} [\log_{(D_B(b))}] + \sum_{A \sim Pd(a)} [\log_{(1-\log_{(D_B(GAB(a))})}]$$

Equation (2)

For Equation (2), $G_{AB}$ may represent the mapping of generator A to discriminator B, DB may represent discriminator B, A and B may represent sample images A and B, and Pd(b) and Pd(a) may represent a Gaussian probability model of the image samples.

Cycle consistency loss may enforce the dependency of generated samples in B on samples A, and likewise generated samples A on samples B. The cycle consistency loss may increase the mutual information such that the generator creates images that are highly similar to the real-world image. The cycle consistency loss may be determined as follows:

$$L_{GAN}(E_A G_{AB} D_{Z_A}) = \sum_{\substack{Z_A \sim P(ZA) \\ Z_S \sim P(ZB)}} [\log_{(D_{Z_A}(ZA))}] + \sum_{A \sim Pd(A)} [\log_{(1-DZA(ZA))}]$$

Equation (3)

For Equation (3), $E_A$ may represent the encoder which maps image A to B, $D_{Z_A}$ may represent discriminator $Z_A$, $Z_A$ may represent the 'police' to capture the generated image by generator A, P(ZA) may represent probability of generated image A being a real or fake image, and P(ZB) may represent probability of generated image B being a real or fake image.

For FIG. 7, 128*8, 128*8, 3 may refer to the image size of pixels 128*8 and of 3 channels RGB. The generator may receive the input image, and regenerate the output image that is of the same image structure. This may be possible as the weights may be present in each layer where the deconvolutional layer de-filters and activates the neurons to create the features.

Figure 8:
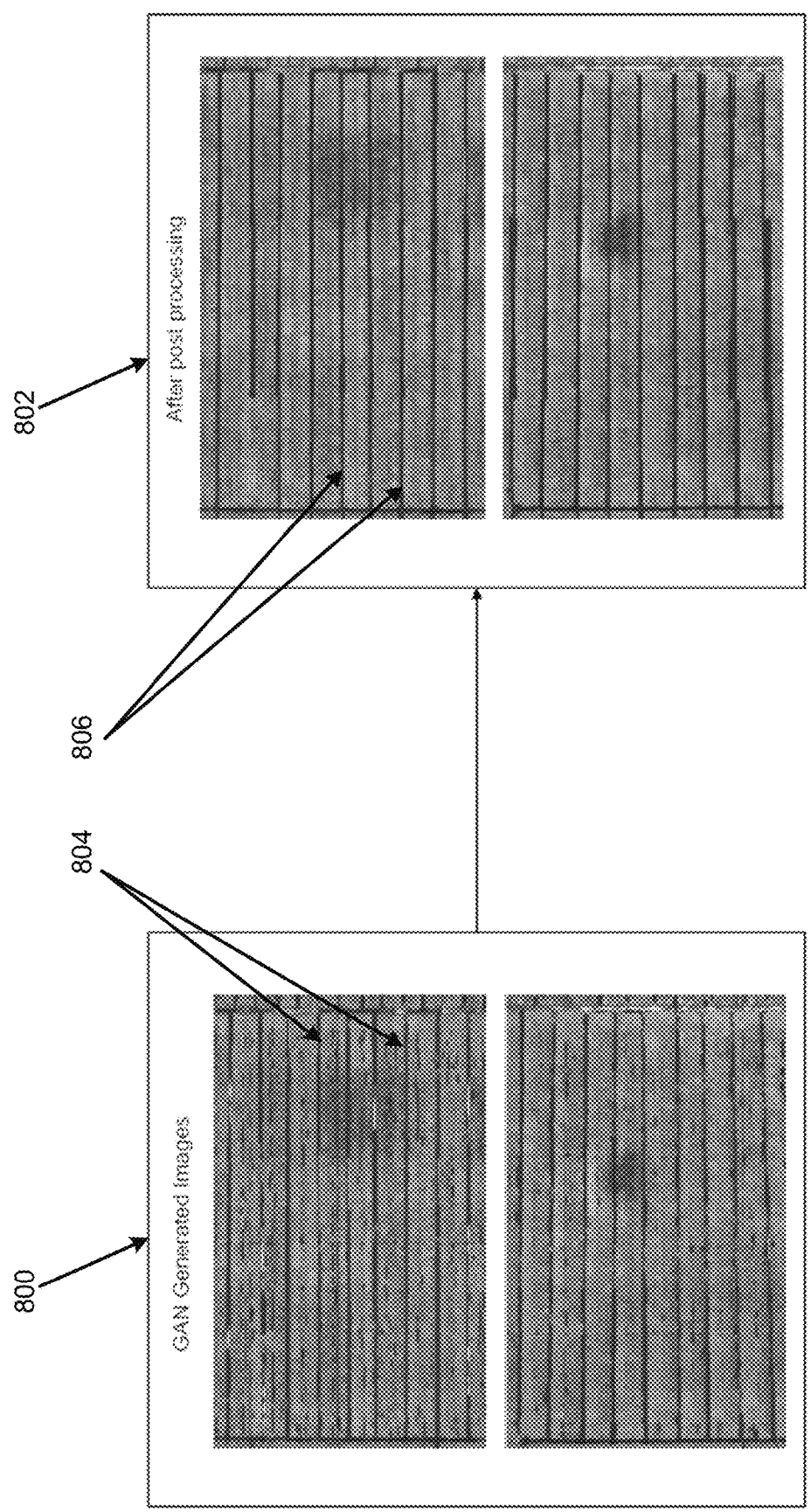
FIG. 8 illustrates generative adversarial analysis for canal line identification to illustrate operation of the artificial intelligence based plantable blank spot detection apparatus of FIG. 1 in accordance with an example of the present disclosure.

FIG. 8 illustrates generative adversarial analysis for canal line identification to illustrate operation of the apparatus 100 in accordance with an example of the present disclosure.

Referring to FIG. 8, CycleGAN generated images (e.g., at 800) that include canal lines and planting lines may be subjected to post-processing (e.g., at 802) by the image post-processor 122. For example, for the canal lines identified at 804, after post-processing, the canal lines may be identified more clearly at 806. In this regard, the image post-processor 122 may implement morphological operations (e.g., open, close, dilation, erosion), skeletonization, and Hough line techniques to remove the noise from the CycleGAN generated images.

Figure 9:
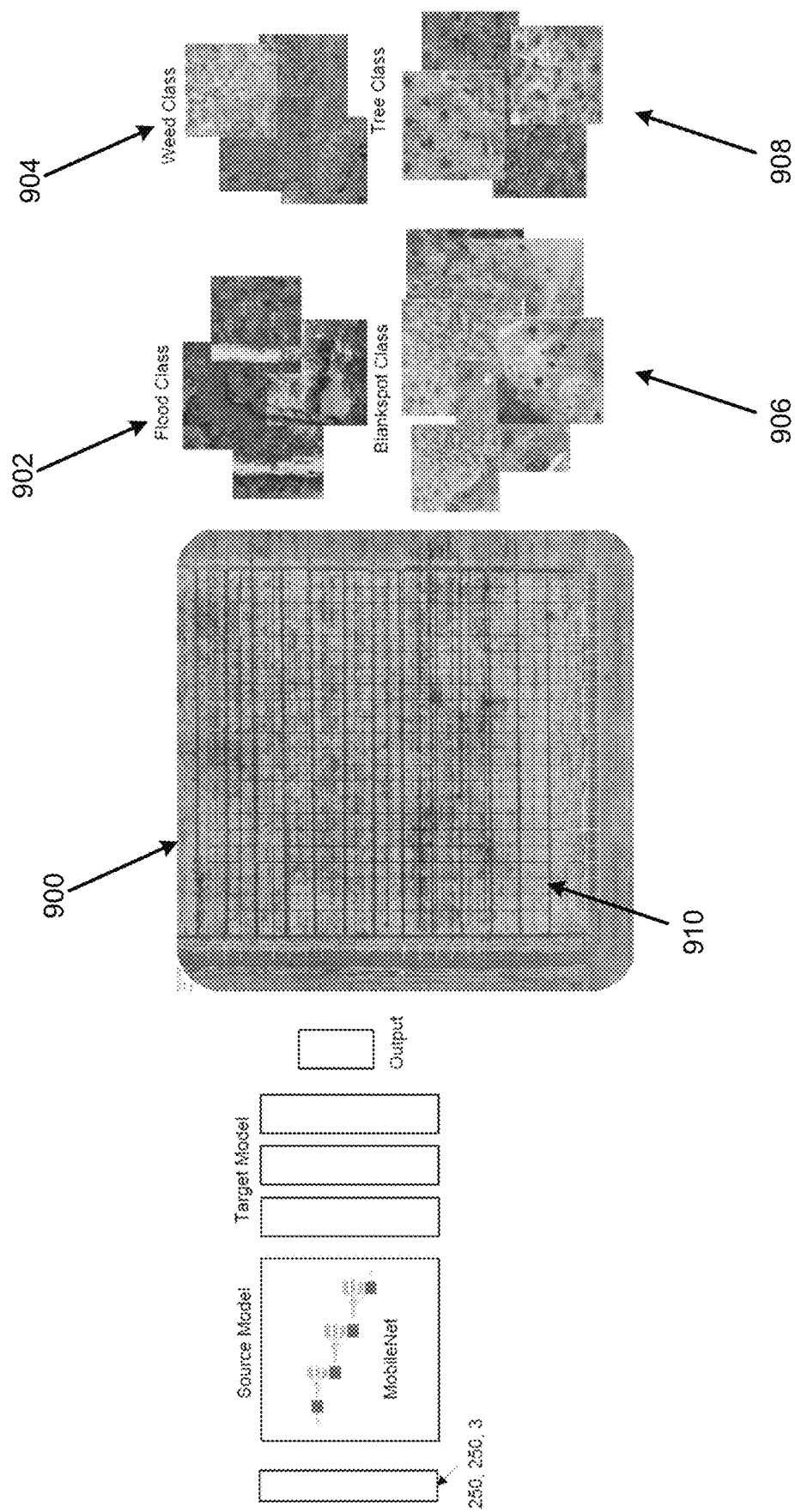
FIG. 9 illustrates convolution neural network (CNN) based image classification to illustrate operation of the artificial intelligence based plantable blank spot detection apparatus of FIG. 1 in accordance with an example of the present disclosure.

FIG. 9 illustrates convolution neural network (CNN) based image classification to illustrate operation of the apparatus 100 in accordance with an example of the present disclosure.

Referring to FIG. 9, the image classifier 118 may determine, based on the canal lines identified in the analyzed images, plantable blank spots 120. In this regard, the image classifier 118 may identify the plantable blank spots 120 which exclude flood and road areas. For example, the image classifier 118 may utilize weights, for example, from MobileNet to train a multiclass model to detect a flood, a tree, weeds, and blank spots based on 10 m×10 m size. For example, for 10 m×10 m size grids shown at 900, a flood class is shown at 902, a weed class is shown at 904, a blank spot class is shown at 906, and a tree class is shown at 908. The displays at 902, 904, 906, and 908 show expanded views of the respective classes from the image at 900. In this regard, the plantable blank spots at 910 may be defined, for example, as a 10 m×10 m grid with less than four trees, and less than 30% weeds, with no canal lines. Canal lines from CycleGAN may be used to remove water bodies and flooded blank spots. Further, hue, saturation, and value (HSV), brightness, sheer, and horizontal and vertical shifts may be utilized to augment data. Upsampling may be used for class balancing.

Figure 10:
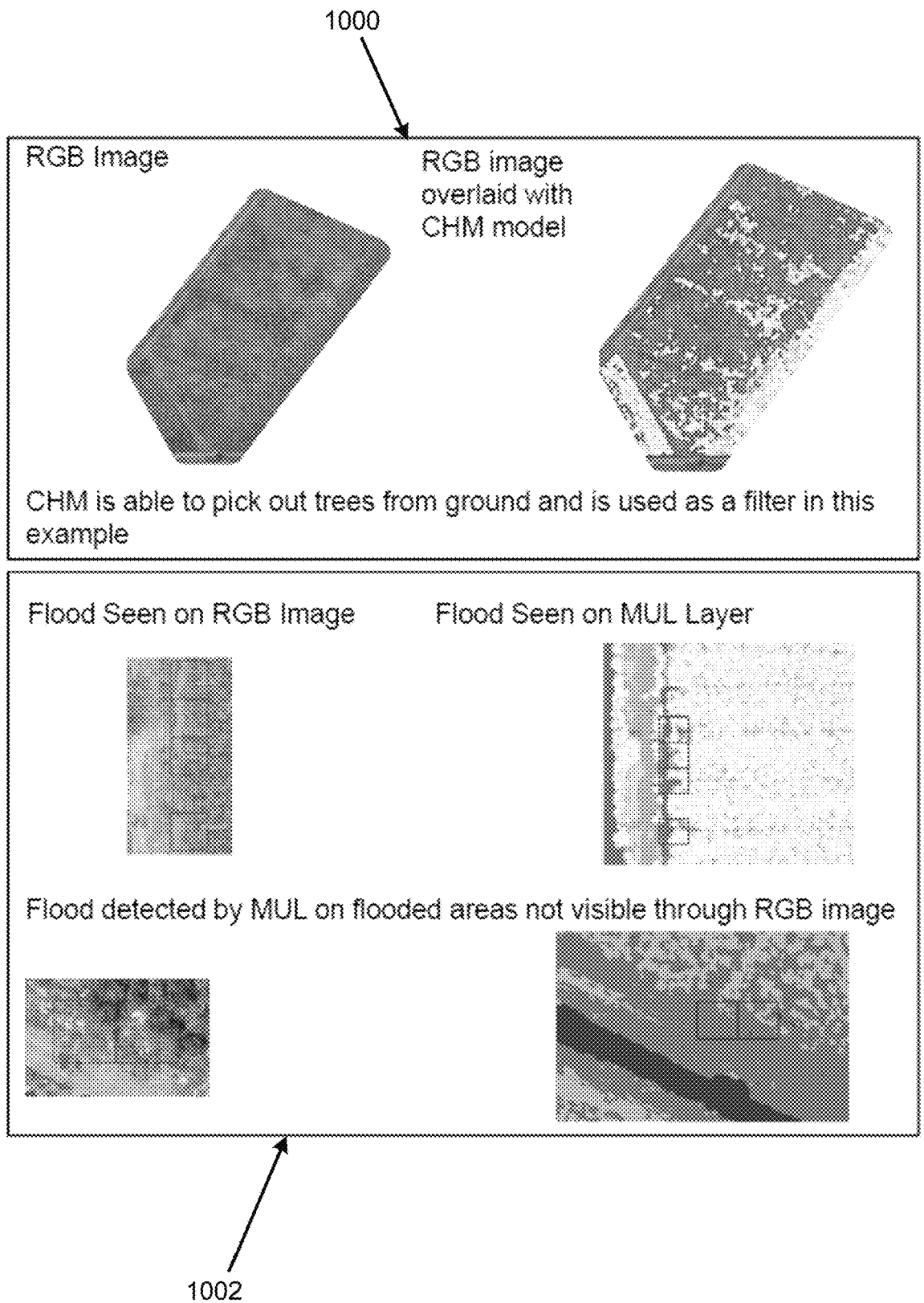
FIG. 10 illustrates pre-processing to generate texture features to illustrate operation of the artificial intelligence based plantable blank spot detection apparatus of FIG. 1 in accordance with an example of the present disclosure.

FIG. 10 illustrates pre-processing to generate texture features to illustrate operation of the apparatus 100 in accordance with an example of the present disclosure.

Referring to FIG. 10, at 1000, the image pre-processor 110 may generate texture features for the analyzed images. In this regard, the image pre-processor 110 may generate surface terrain data, for example, by using LiDAR images. The LiDAR images may be used to derive digital surface models (DSM), digital terrain models (DTM), and canopy height models (CHM). These models may map out elevation, slopes, and terrain data which may be used as additional input to detect unused land and flooded areas. Further, using the DSM, DTM, and CHM models, the image pre-processor 110 may distinguish between trees that are of higher elevation as compared to unused ground.

At 1002, with respect to infrared reflectance data, the image pre-processor 110 may utilize a red edge layer in multispectral (MUL) image to map out regions of change of reflectance of vegetation and water bodies of near infrared range. In this regard, a near infrared and red edge image may be processed to determine reflectance, and then the outputs may be segmented to find various spectrum ranges. Thereafter, RGB images may be used to identify water reflectance range. Water and chlorophyll may absorb light, and therefore the lower the values found in this layer, the greater the amount of water. Using this layer, the image pre-processor 110 may extract spectral features to separate floods from ground and weed areas when flooded areas are not clearly visible on an RGB image.

Figure 11:
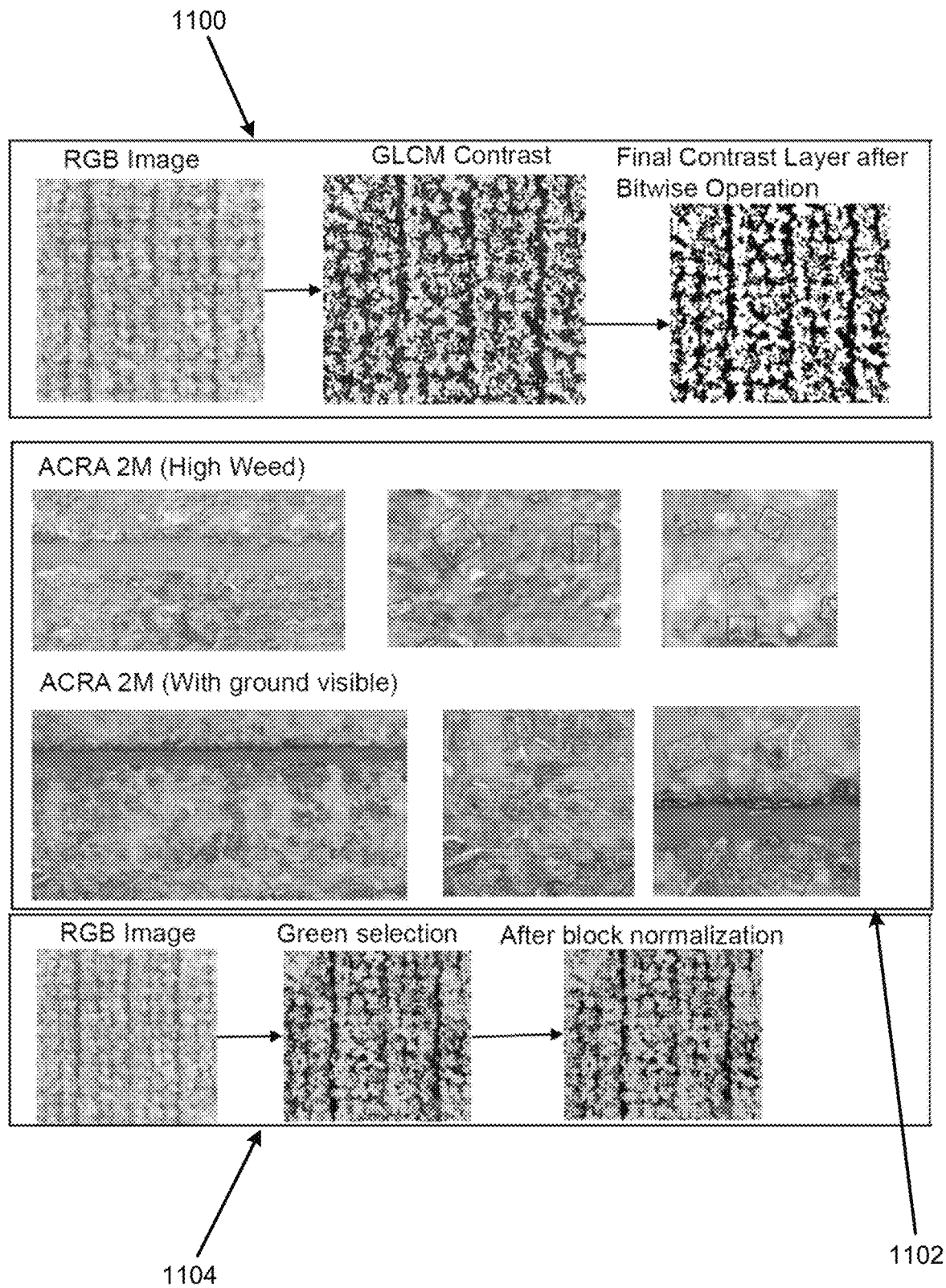
FIG. 11 illustrates further details of pre-processing to generate texture features to illustrate operation of the artificial intelligence based plantable blank spot detection apparatus of FIG. 1 in accordance with an example of the present disclosure.

FIG. 11 illustrates further details of pre-processing to generate texture features to illustrate operation of the apparatus 100 in accordance with an example of the present disclosure.

At 1100, with respect to gray level co-occurrence matrix (GLCM) to generate contrast features, using the GLCM correlation and dissimilarity, the image pre-processor 110 may convert an RGB image into grayscale to extract texture between trees and ground. In this regard, similar features may include similar gray level composition. As illustrated at 1100, the texture may be used to distinguish canals and trees, and may be used as one of the input layers to the deep learning model which may take the texture feature into account while performing the classification to thereby improve the accuracy of the deep learning model.

At 1102, the image pre-processor 110 may a utilize local binary pattern (LBP) to extract features to identify trees and blank spots. In this regard, the LBP may be used specifically for younger trees of age stratum of two months, and for various tree species (e.g., characterized as furry without clear features) as the green hue color selection used to extract the features may not capture the objects of interest. A neighborhood may be defined as a radius of local area of interest, and a binary pattern may be obtained by a thresholding value at the boundary of a neighborhood with a central pixel. An iteration operation may be performed across all pixels in an image, and a histogram of the binary pattern may be used to plot and select a pattern that corresponds with a tree planting pattern. The neighborhood distance may be derived from historical and structured data of planting distance, and outputs may be combined into a single result by performing bitwise operations.

At 1104, the image pre-processor 110 may utilize histogram of gradients. In this regard, an RGB image may be passed through, and count the gradient orientation of the image, of which a histogram of the gradient pattern may be used. For similar bins, block normalization may be performed to add depth as one of the input layers. This technique may be utilized for spectrum normalization, and the normalized images may be used as input for the deep learning model.

Figure 12:
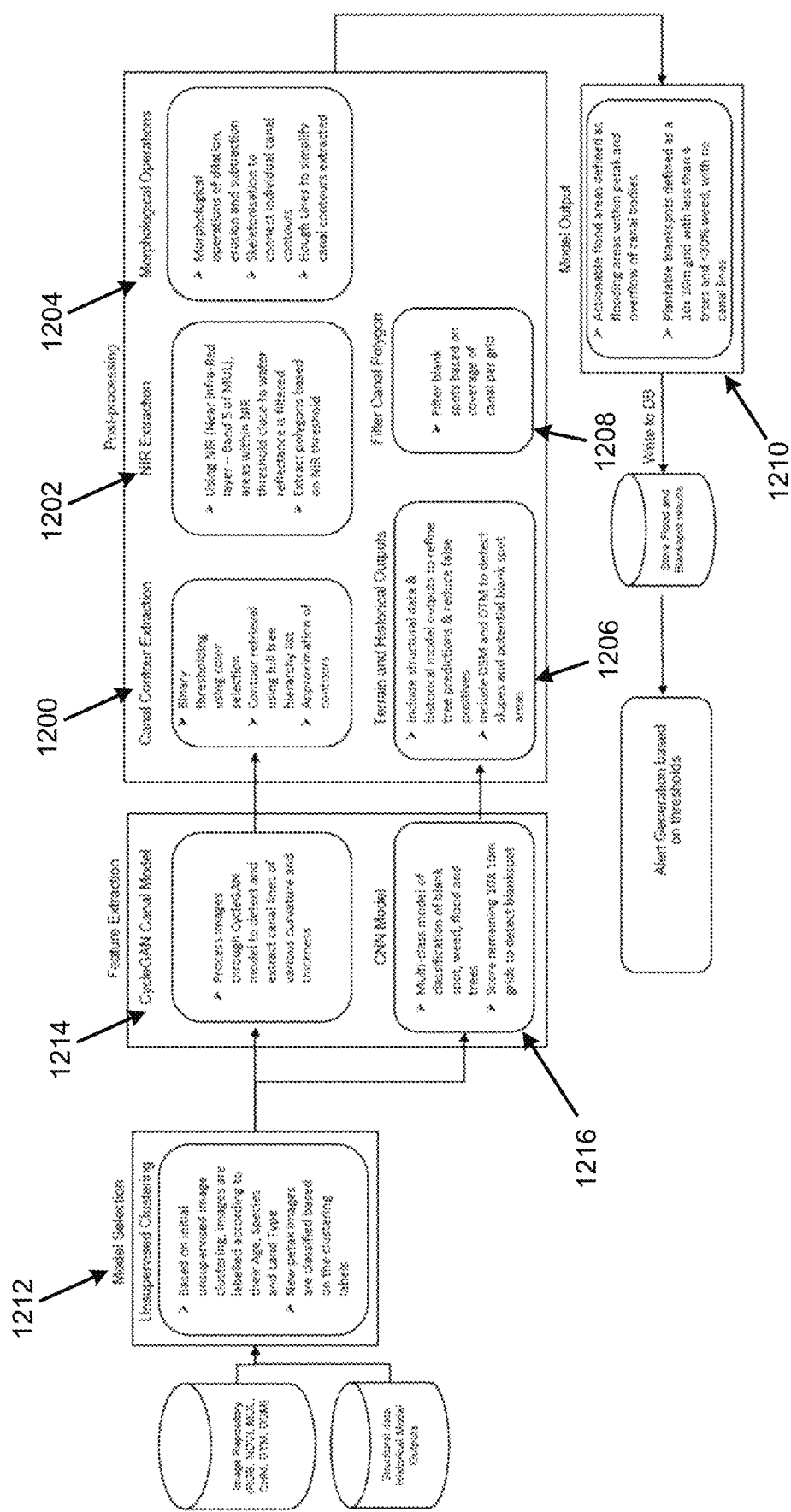
FIG. 12 illustrates post-processing to modify plantable blank spot detection results to illustrate operation of the artificial intelligence based plantable blank spot detection apparatus of FIG. 1 in accordance with an example of the present disclosure.

FIG. 12 illustrates post-processing to modify plantable blank spot detection results to illustrate operation of the apparatus 100 in accordance with an example of the present disclosure.

Referring to FIG. 12, the image post-processor 122 may perform post-processing operations such as canal contour extraction at 1200, near infrared extraction at 1202, morphological operations at 1204, terrain and historical output at 1206, and canal polygon filtering at 1208.

At 1200, with respect to canal contour extraction, the image post-processor 122 may perform binary thresholding using color selection, contour retrieval using a full tree hierarchy list, and contour approximation. In this regard, the post-processing techniques may be used to extract out canals generated as disclosed herein. Since the canals obtained may not perfect yet, computer vision techniques may be used to extract out the shape of contours. As disclosed herein, once the canal contour is obtained in red color, the color may be selected to draw the approximate canal using the guide lines, and thereafter, the shape file of the canals may be extracted.

At 1202, with respect to near infrared extraction, the image post-processor 122 may utilize a near infrared layer (e.g., band 5 of MUL) to filter areas with a near infrared threshold close to water reflectance. Further, the image post-processor 122 may extract polygons based on the near infrared threshold.

At 1204, with respect to morphological operations, the image post-processor 122 may perform morphological operations of dilation, erosion, and subtraction. Further, the image post-processor 122 may perform skeletonisation to connect individual canal contours. The image post-processor 122 may also utilize Hough lines to simplify canal contours that are extracted.

At 1206, with respect to terrain and historical inputs, the image post-processor 122 may utilize structural data and historical model outputs to refine tree predictions based on a planting regime which provides the spacing between the trees, and hence reduce false positives for blank spots. In this regard, the image post-processor 122 may utilize DSM and DTM to detect slopes and potential blank spot areas, where terrain information may be created from DSM and DTM. This terrain information may be used to identify overall altitude and historical data to confirm if a flood occurs in the areas (since chances of flood re-occurring in an area may be higher). The deep learning model may thus implement lower cutoffs for detecting floods, and the chances of detecting a flood may thereby increase when the texture color in an image indicates a possibility of flooding.

At 1208, with respect to canal polygon filtering, the image post-processor 122 may filter out the blank spots based on coverage of a canal per grid. For example, if a canal covers 30% of the area where a blank spot is identified, then the blank spot may be filtered out since it may not be of enough value to end users.

At 1210, an output of the image post-processor 122 may include an indication of actionable flood areas that may be defined as flooding areas within a compartment and overflow of canal bodies. Further, plantable blank spots may be defined, for example, as a 10 m×10 m grid with less than four trees, and less than 30% weeds, with no canal lines.

Model selection, CycleGAN based canal identification, and convolution neural network based plantable blank spot detection as disclosed herein with respect to block 202 of FIG. 2 may be implemented at blocks 1212, 1214, and 1216, respectively.

Figure 13:
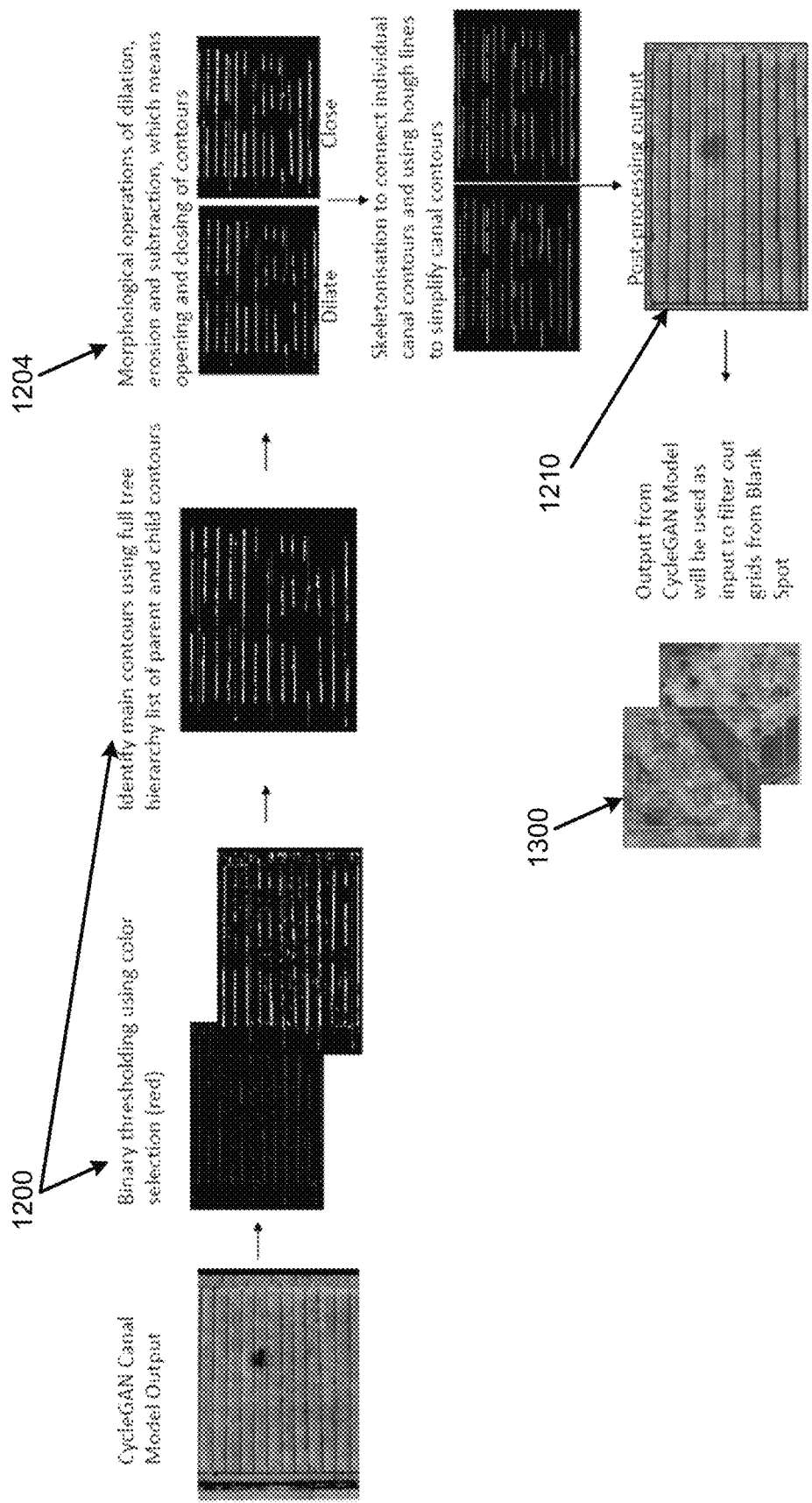
FIG. 13 illustrates further details of post-processing to modify plantable blank spot detection results to illustrate operation of the artificial intelligence based plantable blank spot detection apparatus of FIG. 1 in accordance with an example of the present disclosure.

FIG. 13 illustrates further details of post-processing to modify plantable blank spot detection results to illustrate operation of the apparatus 100 in accordance with an example of the present disclosure.

Referring to FIG. 13, as disclosed herein with reference to FIG. 12, the image post-processor 122 may perform post-processing operations such as canal contour extraction at 1200, and morphological operations at 1204. With respect to the post-processing output at 1210, at 1300, the output may be used as an input to filter out grids from blank spots. Canal shape files may be created from the output of CycleGAN and post processing. These canal shape files may then be subtracted by image to image comparison from blank spot outputs, thus resulting in the identification of blank spots that are not flooded or have canals passing thru them.

Figure 14:
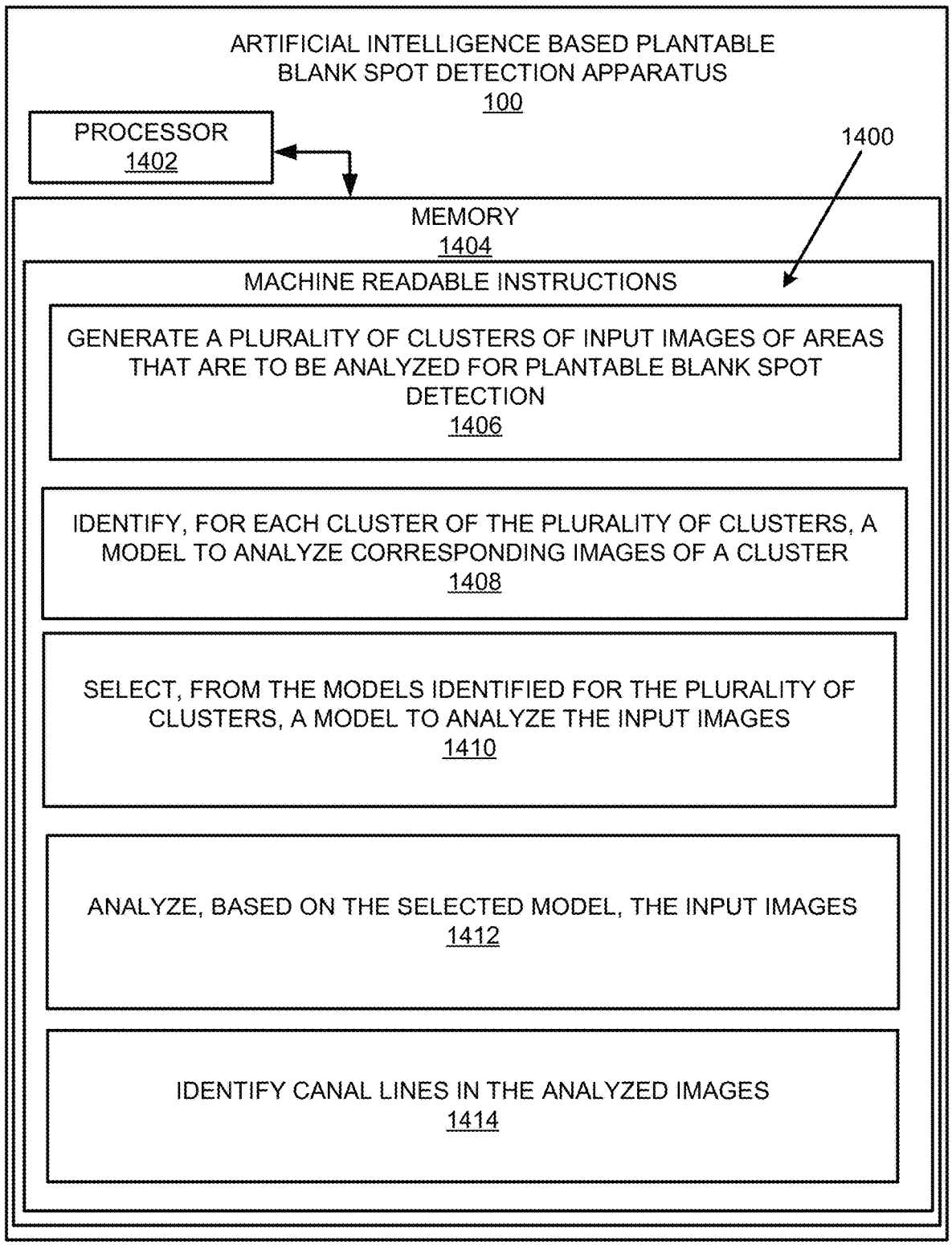
FIG. 14 illustrates an example block diagram for artificial intelligence based plantable blank spot detection in accordance with an example of the present disclosure.
Figure 14:
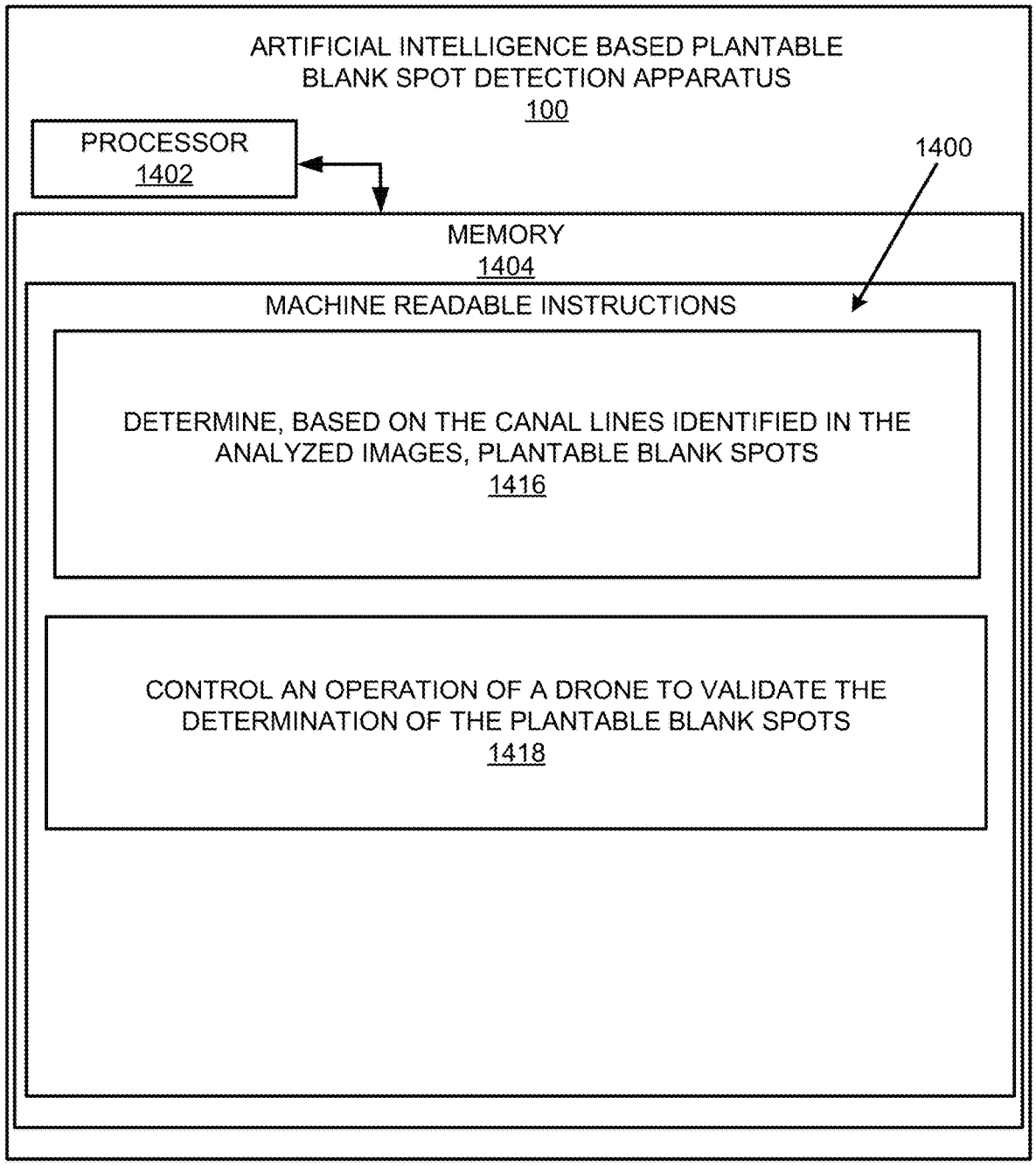
Figure 15:
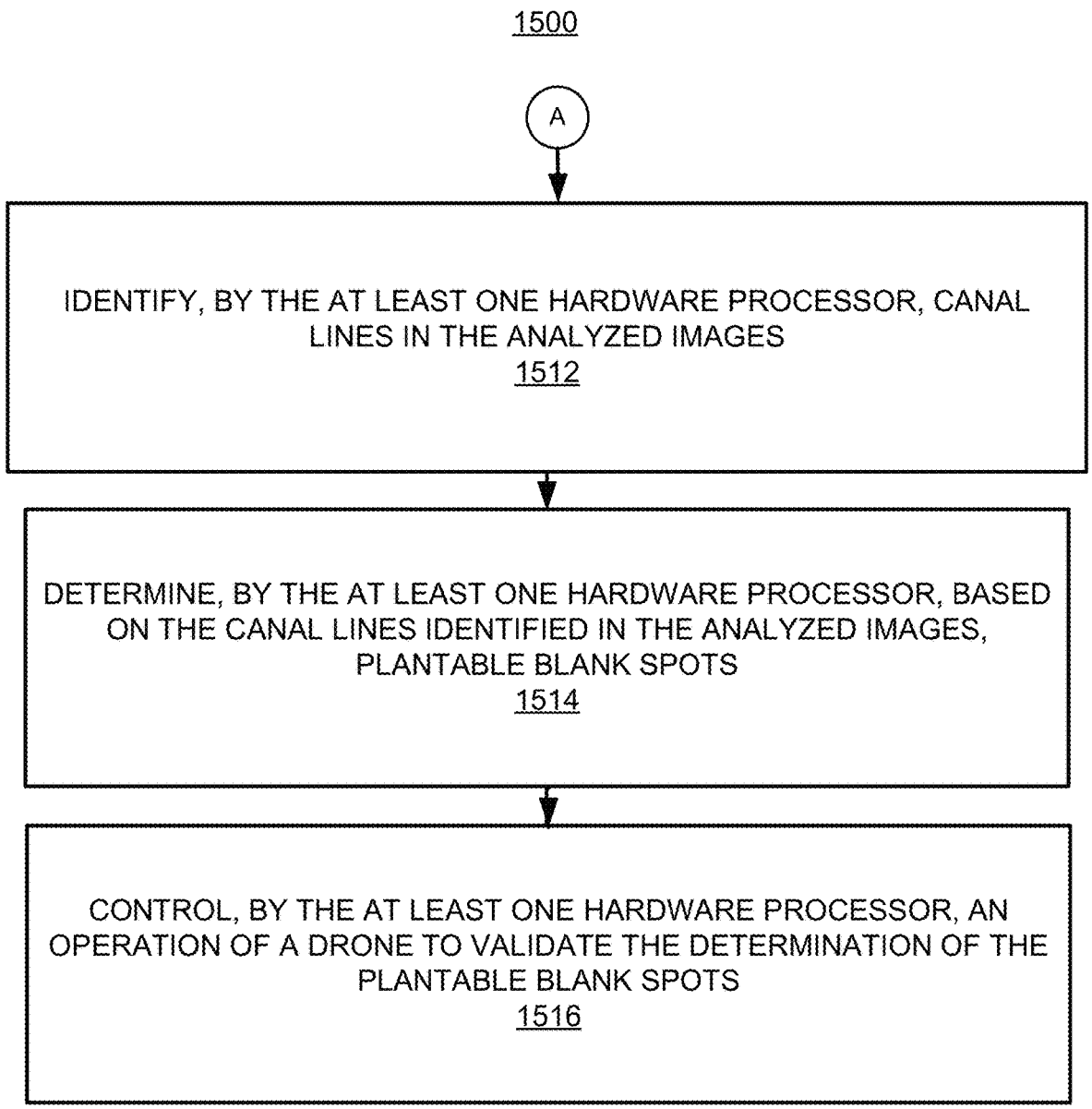
FIG. 15 illustrates a flowchart of an example method for artificial intelligence based plantable blank spot detection in accordance with an example of the present disclosure.
Figure 16:
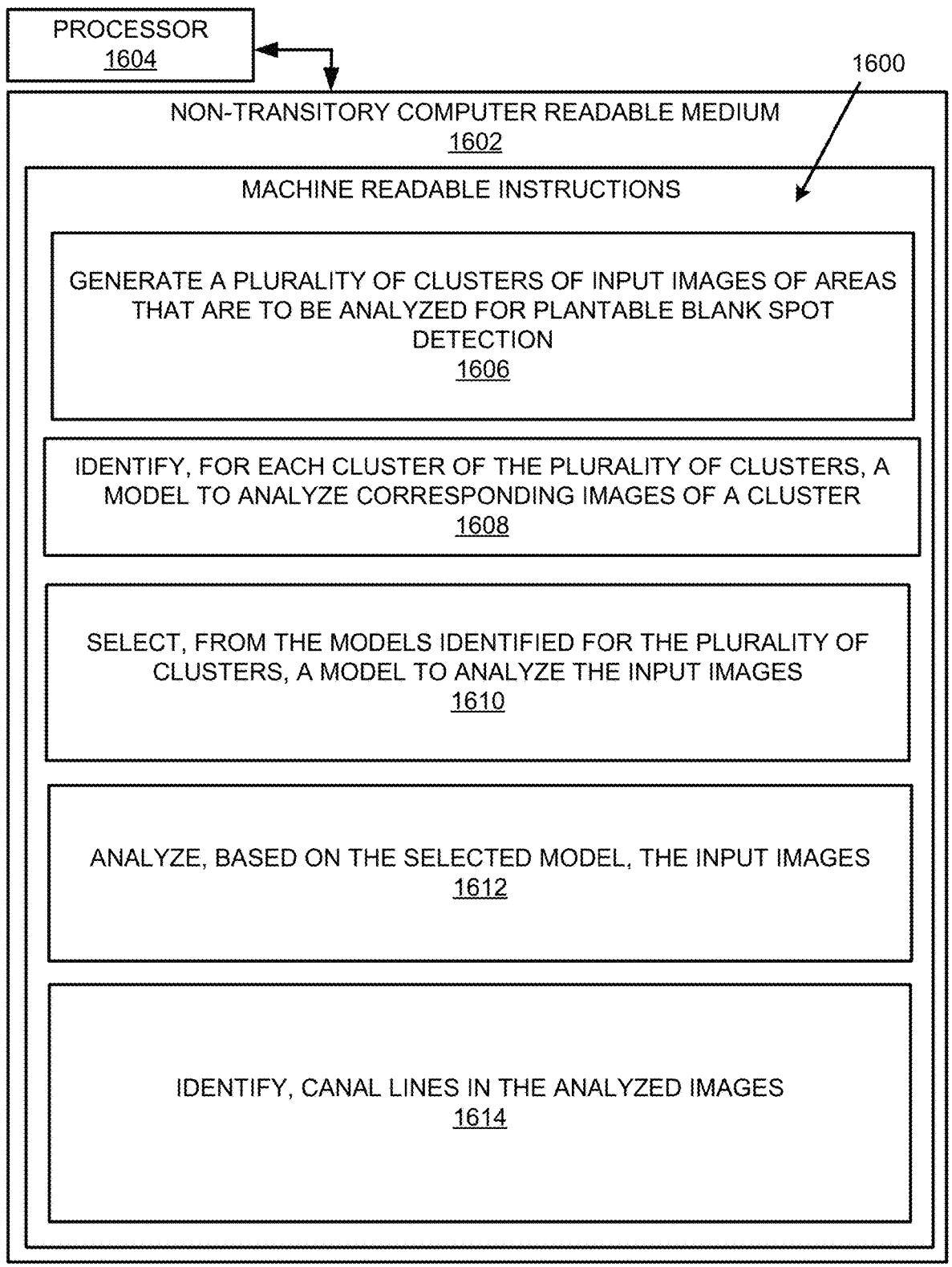
FIG. 16 illustrates a further example block diagram for artificial intelligence based plantable blank spot detection in accordance with another example of the present disclosure.
Figure 16:
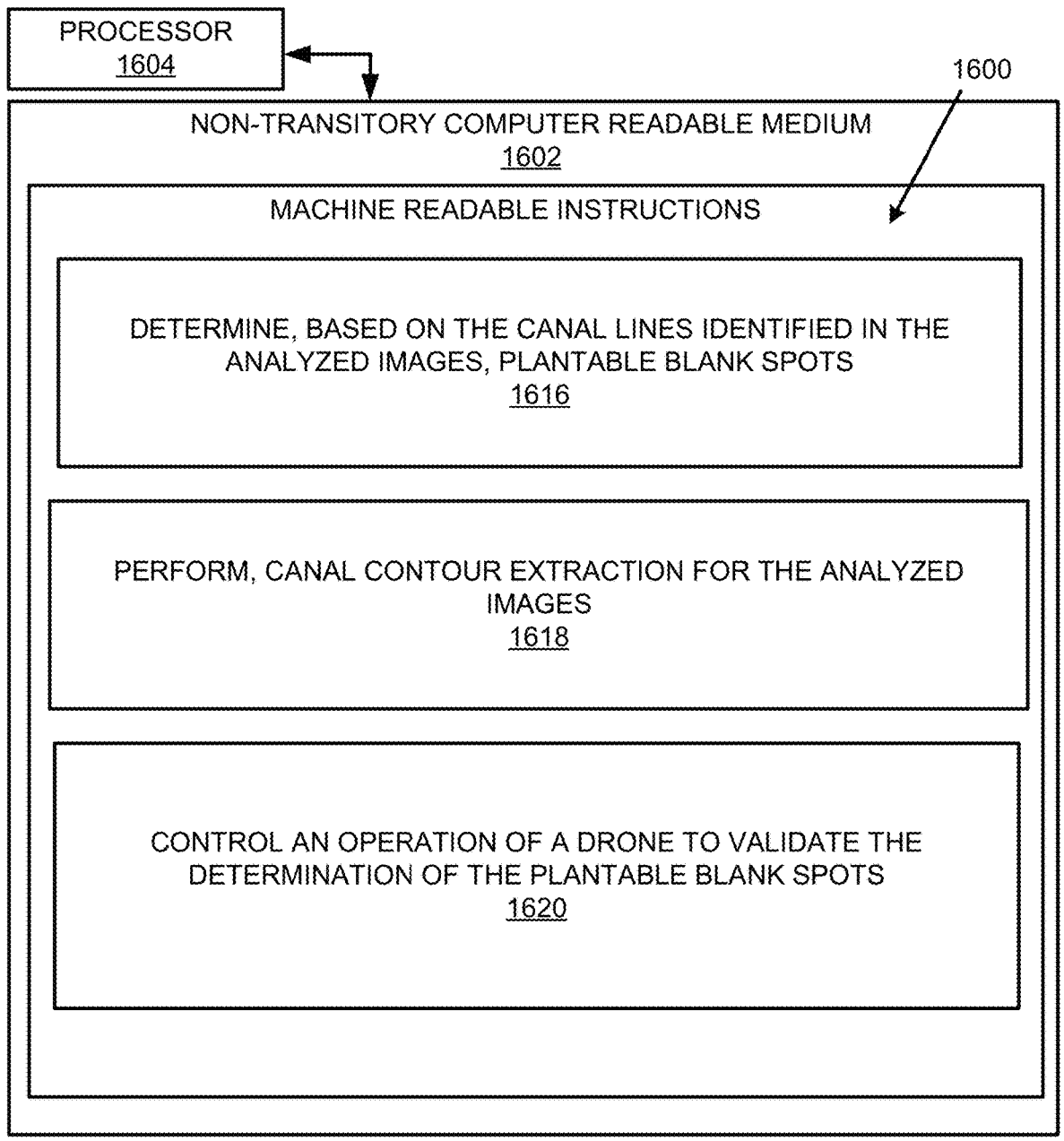

FIGS. 14-16 respectively illustrate an example block diagram 1400, a flowchart of an example method 1500, and a further example block diagram 1600 for artificial intelligence based plantable blank spot detection, according to examples. The block diagram 1400, the method 1500, and the block diagram 1600 may be implemented on the apparatus 100 described above with reference to FIG. 1 by way of example and not of limitation. The block diagram 1400, the method 1500, and the block diagram 1600 may be practiced in other apparatus. In addition to showing the block diagram 1400, FIG. 14 shows hardware of the apparatus 100 that may execute the instructions of the block diagram 1400. The hardware may include a processor 1402, and a memory 1404 storing machine readable instructions that when executed by the processor cause the processor to perform the instructions of the block diagram 1400. The memory 1404 may represent a non-transitory computer readable medium. FIG. 15 may represent an example method for artificial intelligence based plantable blank spot detection, and the steps of the method. FIG. 16 may represent a non-transitory computer readable medium 1602 having stored thereon machine readable instructions to provide artificial intelligence based plantable blank spot detection according to an example. The machine readable instructions, when executed, cause a processor 1604 to perform the instructions of the block diagram 1600 also shown in FIG. 16.

The processor 1402 of FIG. 14 and/or the processor 1604 of FIG. 16 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1602 of FIG. 16), such as hardware storage devices (e.g., RAM (random access memory), ROM (read only memory), EPROM (erasable, programmable ROM), EEPROM (electrically erasable, programmable ROM), hard drives, and flash memory). The memory 1404 may include a RAM, where the machine readable instructions and data for a processor may reside during runtime.

Referring to FIGS. 1-14, and particularly to the block diagram 1400 shown in FIG. 14, the memory 1404 may include instructions 1406 to generate a plurality of clusters 104 of input images 106 of areas that are to be analyzed for plantable blank spot detection.

The processor 1402 may fetch, decode, and execute the instructions 1408 to identify, for each cluster of the plurality of clusters 104, a model (e.g., from models 1-n) to analyze corresponding images of a cluster.

The processor 1402 may fetch, decode, and execute the instructions 1410 to select, from the models identified for the plurality of clusters, a model 108 to analyze the input images 106.

The processor 1402 may fetch, decode, and execute the instructions 1412 to analyze, based on the selected model 108, the input images.

The processor 1402 may fetch, decode, and execute the instructions 1414 to identify canal lines in the analyzed images.

The processor 1402 may fetch, decode, and execute the instructions 1416 to determine, based on the canal lines identified in the analyzed images, plantable blank spots 120.

The processor 1402 may fetch, decode, and execute the instructions 1418 to control an operation of a drone 126 to validate the determination of the plantable blank spots 120.

Referring to FIGS. 1-13 and 15, and particularly FIG. 15, for the method 1500, at block 1502, the method may include generating a plurality of clusters 104 of input images 106 of areas that are to be analyzed for plantable blank spot detection.

At block 1504, the method may include identifying, for each cluster of the plurality of clusters 104, a model (e.g., from models 1-n) to analyze corresponding images of a cluster.

At block 1506, the method may include selecting, from the models identified for the plurality of clusters 104, a model 108 to analyze the input images 106.

At block 1508, the method may include analyzing, based on the selected model 108, the input images 106.

At block 1510, the method may include generating texture features for the analyzed images.

At block 1512, the method may include identifying canal lines in the analyzed images.

At block 1514, the method may include determining, based on the canal lines identified in the analyzed images, plantable blank spots 120.

At block 1516, the method may include controlling an operation of a drone 126 to validate the determination of the plantable blank spots 120.

Referring to FIGS. 1-13 and 16, and particularly FIG. 16, for the block diagram 1600, the non-transitory computer readable medium 1602 may include instructions 1606 to generate a plurality of clusters 104 of input images 106 of areas that are to be analyzed for plantable blank spot detection.

The processor 1604 may fetch, decode, and execute the instructions 1608 to identify, for each cluster of the plurality of clusters 104, a model (e.g., from models 1-n) to analyze corresponding images of a cluster.

The processor 1604 may fetch, decode, and execute the instructions 1610 to select, from the models identified for the plurality of clusters 104, a model 108 to analyze the input images 106.

The processor 1604 may fetch, decode, and execute the instructions 1612 to analyze, based on the selected model 108, the input images.

The processor 1604 may fetch, decode, and execute the instructions 1614 to identify canal lines in the analyzed images.

The processor 1604 may fetch, decode, and execute the instructions 1616 to determine, based on the canal lines identified in the analyzed images, plantable blank spots 120.

The processor 1604 may fetch, decode, and execute the instructions 1618 to perform canal contour extraction for the analyzed images.

The processor 1604 may fetch, decode, and execute the instructions 1620 to control an operation of a drone 126 to validate the determination of the plantable blank spots 120.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence based plantable blank spot detection apparatus comprising:
   a model identifier, executed by at least one hardware processor, to
   generate a plurality of clusters of input images of areas that are to be analyzed for plantable blank spot detection;
   identify, for each cluster of the plurality of clusters, a model to analyze corresponding images of a cluster;
   select, from the models identified for the plurality of clusters, a model to analyze the input images; and
   analyze, based on the selected model, the input images;
   a generative adversarial analyzer, executed by the at least one hardware processor, to
   identify canal lines in the analyzed images;
   an image classifier, executed by the at least one hardware processor, to
   determine, based on the canal lines identified in the analyzed images, plantable blank spots; and
   a drone controller, executed by the at least one hardware processor, to
   control an operation of a drone to validate the determination of the plantable blank spots.

2. The apparatus according to claim 1, wherein the model identifier is executed by the at least one hardware processor to generate the plurality of clusters of input images of areas that are to be analyzed for plantable blank spot detection by:
   generating the plurality of clusters based on an age of vegetation including trees, a species of the vegetation, and a land type of the areas that are to be analyzed for plantable blank spot detection.

3. The apparatus according to claim 1, wherein the model identifier is executed by the at least one hardware processor to select, from the models identified for the plurality of clusters, the model to analyze the input images by:

determining, for each cluster of the plurality of clusters, from a plurality of available models, the selected model based on a highest number of matches to an age of vegetation including trees in the corresponding images of the cluster, a species of the vegetation, and a land type of the areas that are to be analyzed for plantable blank spot detection.

4. The apparatus according to claim 1, wherein the generative adversarial analyzer is executed by the at least one hardware processor to identify canal lines in the analyzed images by:
  implementing CycleGAN to identify canal lines in the analyzed images.

5. The apparatus according to claim 1, wherein the generative adversarial analyzer is executed by the at least one hardware processor to identify canal lines in the analyzed images by:
  utilizing a generator to
    learn features of a real-world input image, and
    translate the input image to a generated image;
  utilizing a discriminator to distinguish between the real-world input image and the generated image;
  minimizing a loss factor with respect to the generator and the discriminator; and
  identifying, based on images generated by the generator from the analyzed images, the canal lines in the images generated by the generator.

6. The apparatus according to claim 1, wherein the image classifier is executed by the at least one hardware processor to determine, based on the canal lines identified in the analyzed images, plantable blank spots by:
  utilizing a convolutional neural network (CNN) to determine, based on the canal lines identified in the analyzed images, plantable blank spots.

7. The apparatus according to claim 1, wherein the image classifier is executed by the at least one hardware processor to determine, based on the canal lines identified in the analyzed images, plantable blank spots by:
  utilizing a convolutional neural network (CNN) to distinguish between a flood area, a tree area, a weed area, and a plantable blank spot in each image of the analyzed images.

8. The apparatus according to claim 1, further comprising:
  an image pre-processor, executed by the at least one hardware processor, to generate texture features for the analyzed images.

9. The apparatus according to claim 1, further comprising:
  an image post-processor, executed by the at least one hardware processor, to perform canal contour extraction for the analyzed images.

10. The apparatus according to claim 1, further comprising:
  an image post-processor, executed by the at least one hardware processor, to perform morphological operations of dilation, erosion, and subtraction for the analyzed images.

11. The apparatus according to claim 1, further comprising:
  an image post-processor, executed by the at least one hardware processor, to perform skeletonisation to connect individual canal contours for the analyzed images.

12. A method for artificial intelligence based plantable blank spot detection, the method comprising:
  generating, by at least one hardware processor, a plurality of clusters of input images of areas that are to be analyzed for plantable blank spot detection;
  identifying, by the at least one hardware processor, for each cluster of the plurality of clusters, a model to analyze corresponding images of a cluster;
  selecting, by the at least one hardware processor, from the models identified for the plurality of clusters, a model to analyze the input images;
  analyzing, by the at least one hardware processor, based on the selected model, the input images;
  generating, by the at least one hardware processor, texture features for the analyzed images;
  identifying, by the at least one hardware processor, canal lines in the analyzed images, the analyzed images including the generated texture features;
  determining, by the at least one hardware processor, based on the canal lines identified in the analyzed images, plantable blank spots; and
  controlling, by the at least one hardware processor, an operation of a drone to validate the determination of the plantable blank spots.

13. The method according to claim 12, wherein generating, by the at least one hardware processor, the plurality of clusters of input images of areas that are to be analyzed for plantable blank spot detection, further comprises:
  generating the plurality of clusters based on an age of vegetation including trees, a species of the vegetation, and a land type of the areas that are to be analyzed for plantable blank spot detection.

14. The method according to claim 12, wherein selecting, by the at least one hardware processor, from the models identified for the plurality of clusters, the model to analyze the input images, further comprises:
  determining, for each cluster of the plurality of clusters, from a plurality of available models, the selected model based on a highest number of matches to an age of vegetation including trees in the corresponding images of the cluster, a species of the vegetation, and a land type of the areas that are to be analyzed for plantable blank spot detection.

15. The method according to claim 12, wherein identifying, by the at least one hardware processor, canal lines in the analyzed images, further comprises:
  implementing CycleGAN to identify, canal lines in the analyzed images.

16. The method according to claim 12, wherein identifying, by the at least one hardware processor, canal lines in the analyzed images, further comprises:
  utilizing a generator to
    learn features of a real-world input image, and
    translate the input image to a generated image;
  utilizing a discriminator to distinguish between the real-world input image and the generated image;
  minimizing a loss factor with respect to the generator and the discriminator; and
  identifying, based on images generated by the generator from the analyzed images, the canal lines in the images generated by the generator.

17. A non-transitory computer readable medium having stored thereon machine readable instructions, the machine readable instructions, when executed by at least one hardware processor, cause the at least one hardware processor to:
  generate a plurality of clusters of input images of areas that are to be analyzed for plantable blank spot detection;
  identify, for each cluster of the plurality of clusters, a model to analyze corresponding images of a cluster;
  select, from the models identified for the plurality of clusters, a model to analyze the input images;

analyze, based on the selected model, the input images;
identify canal lines in the analyzed images;
determine, based on the canal lines identified in the analyzed images, plantable blank spots;
perform canal contour extraction for the analyzed images; and
control an operation of a drone to validate the determination of the plantable blank spots, the analyzed images including the canal contour extraction.

18. The non-transitory computer readable medium according to claim 17, wherein the machine readable instructions to determine, based on the canal lines identified in the analyzed images, plantable blank spots, when executed by the at least one hardware processor, further cause the at least one hardware processor to:
utilize a convolutional neural network (CNN) to determine, based on the canal lines identified in the analyzed images, plantable blank spots.

19. The non-transitory computer readable medium according to claim 17, wherein the machine readable instructions to determine, based on the canal lines identified in the analyzed images, plantable blank spots in the analyzed images, when executed by the at least one hardware processor, further cause the at least one hardware processor to:
utilize a convolutional neural network (CNN) to distinguish between a flood area, a tree area, a weed area, and a plantable blank spot in each image of the analyzed images.

20. The non-transitory computer readable medium according to claim 17, wherein the machine readable instructions, when executed by the at least one hardware processor, further cause the at least one hardware processor to:
generate texture features for the analyzed images.

* * * * *